US012294243B2

(12) United States Patent
Sasaki et al.

(10) Patent No.: US 12,294,243 B2
(45) Date of Patent: May 6, 2025

(54) ROTATING ELECTRIC MACHINE

(71) Applicant: Mitsubishi Electric Corporation, Tokyo (JP)

(72) Inventors: Hidenori Sasaki, Tokyo (JP); Kenta Motoyoshi, Tokyo (JP); Shohei Fujikura, Tokyo (JP); Hiroko Ikeda, Tokyo (JP); Koji Kawamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 217 days.

(21) Appl. No.: 17/927,741

(22) PCT Filed: Aug. 20, 2020

(86) PCT No.: PCT/JP2020/031489
§ 371 (c)(1),
(2) Date: Nov. 25, 2022

(87) PCT Pub. No.: WO2022/038750
PCT Pub. Date: Feb. 24, 2022

(65) Prior Publication Data
US 2023/0208225 A1   Jun. 29, 2023

(51) Int. Cl.
*H02K 1/278* (2022.01)
*H02K 1/276* (2022.01)
(Continued)

(52) U.S. Cl.
CPC ......... *H02K 1/278* (2013.01); *H02K 1/2773* (2013.01); *H02K 1/28* (2013.01); *H02K 7/003* (2013.01)

(58) Field of Classification Search
CPC ...... H02K 7/003; H02K 1/2773; H02K 1/278; H02K 2213/03; H02K 1/2766; H02K 1/276; H02K 1/2753; H02K 1/27
(Continued)

(56) References Cited

U.S. PATENT DOCUMENTS

| 2013/0234555 A1 | 9/2013 | Takizawa et al. |
| 2015/0318746 A1* | 11/2015 | Miyajima ............ H02K 1/2773 |
| | | 310/156.56 |

(Continued)

FOREIGN PATENT DOCUMENTS

| JP | S62-213538 A | 9/1987 |
| JP | H04-128056 U | 11/1992 |

(Continued)

OTHER PUBLICATIONS

International Search Report and Written Opinion mailed on Oct. 20, 2020, received for PCT Application PCT/JP2020/031489, filed on Aug. 20, 2020, 10 pages including English Translation.
(Continued)

*Primary Examiner* — Alexander A Singh
(74) *Attorney, Agent, or Firm* — XSENSUS LLP

(57) ABSTRACT

A rotating electric machine includes a stator and a rotor. The rotor includes a rotor core and a plurality of permanent magnets. The rotor core includes a plurality of core portions. The rotor core includes an annular portion and a plurality of coupling portions. Each of the plurality of coupling portions couples the annular portion and a first core portion of each of the plurality of core portions to each other. Each of the plurality of coupling portions has at least one coupling path. A sum of a width of a portion having the smallest width in at least one coupling path is smaller than a length of a joining boundary between the annular portion and each of the plurality of coupling portions.

18 Claims, 19 Drawing Sheets

(51) Int. Cl.
*H02K 1/28* (2006.01)
*H02K 7/00* (2006.01)

(58) Field of Classification Search
USPC ............ 310/156.01, 156.53, 156.56, 156.57,
310/156.83
See application file for complete search history.

(56) References Cited

U.S. PATENT DOCUMENTS

| | | |
|---|---|---|
| 2017/0271932 A1 | 9/2017 | Tanaka |
| 2022/0149681 A1 | 5/2022 | Motoyoshi et al. |
| 2022/0294289 A1* | 9/2022 | Okuyama ............... H02K 21/16 |

FOREIGN PATENT DOCUMENTS

| | | | |
|---|---|---|---|
| JP | 2000-232744 | A | 8/2000 |
| JP | 2005-168151 | A | 6/2005 |
| JP | 2010-094001 | A | 4/2010 |
| JP | 2010-200480 | A | 9/2010 |
| JP | 2013-172491 | A | 9/2013 |
| JP | 2013-187954 | A | 9/2013 |
| JP | 2015-211623 | A | 11/2015 |
| JP | 6641545 | B1 | 2/2020 |

OTHER PUBLICATIONS

Notice of Reasons for Refusal mailed on Dec. 21, 2021, received for JP Application 2021-522111, 10 pages including English Translation.

* cited by examiner

ROTATING ELECTRIC MACHINE

CROSS-REFERENCE TO RELATED APPLICATION

The present application is based on PCT filing PCT/JP2020/031489, filed Aug. 20, 2020, the entire contents of which are incorporated herein by reference.

TECHNICAL FIELD

This disclosure relates to a rotating electric machine including a rotor which includes a rotor core and a plurality of permanent magnets provided to the rotor core.

BACKGROUND ART

In Patent Literature 1, an interior magnet motor is described. In an annular surface of a rotor of the interior magnet motor, rectangular slits which are half as many as the number of motor poles and rectangular permanent magnets which are as many as the number of slits are alternately arranged in a circumferential direction. Segment regions which are as many as the number of motor poles are formed between the slits and the permanent magnets. The segment regions are magnetized alternately to N poles and S poles along the circumferential direction.

CITATION LIST

Patent Literature

[PTL 1] JP 2010-200480 A

SUMMARY OF INVENTION

Technical Problem

In the rotor of the interior magnet motor described above, two segment regions adjacent to each other across the slit are connected to each other through a connecting portion located on an inner peripheral side with respect to the slit and a connecting portion located on an outer peripheral side with respect to the slit. Thus, in the rotor, a closed magnetic circuit in which a magnetic flux flows through those connecting portions in the circumferential direction is formed. Thus, there is a problem in that circumferential leakage magnetic fluxes that are not interlinked with a stator increase, thereby degrading torque output in the motor.

This disclosure has been made in view of the above-mentioned problem, and has an object to provide a rotating electric machine capable of improving torque output.

Solution to Problem

According to this disclosure, there is provided a rotating electric machine, including: a stator; and a rotor provided on an inner peripheral side of the stator so as to be rotatable with respect to the stator, wherein the rotor includes: a rotor core; a plurality of permanent magnets provided to the rotor core; and a shaft which is fixed to a center portion of the rotor core, and extends in an axial direction of the rotor, wherein the rotor core has a plurality of holes arranged in a circumferential direction of the rotor, wherein the plurality of holes include a plurality of first holes and a plurality of second holes, wherein the plurality of permanent magnets are inserted only into the plurality of first holes of the plurality of holes, respectively, wherein the plurality of first holes and the plurality of second holes are alternately arranged one by one in the circumferential direction, wherein the rotor core includes a plurality of core portions arranged in the circumferential direction with the plurality of second holes defined therebetween, respectively, wherein the plurality of permanent magnets are magnetized such that magnetic-pole surfaces facing each other in the circumferential direction have different poles, wherein each of the plurality of core portions includes: a first core portion located on one magnetic-pole surface side of each of the plurality of permanent magnets; and a second core portion located on the other magnetic-pole surface side of each of the plurality of permanent magnets, wherein the rotor core includes a first rotor core in at least a part in the axial direction, wherein the first rotor core includes a first annular portion and a plurality of first coupling portions, wherein the first annular portion is provided on an inner peripheral side with respect to the plurality of core portions, and is formed such that the shaft is inserted thereinto, wherein each of the plurality of first coupling portions couples the first annular portion and the first core portion of each of the plurality of core portions to each other, wherein each of the plurality of first coupling portions includes at least one coupling path, and wherein a sum of a width of a portion having a smallest width in the at least one coupling path is smaller than a length of a joining boundary having an arc shape between the first annular portion and each of the plurality of first coupling portions.

Advantageous Effects of Invention

According to this disclosure, the torque output in the rotating electric machine can be improved.

DESCRIPTION OF EMBODIMENTS

First Embodiment

Figure 1:
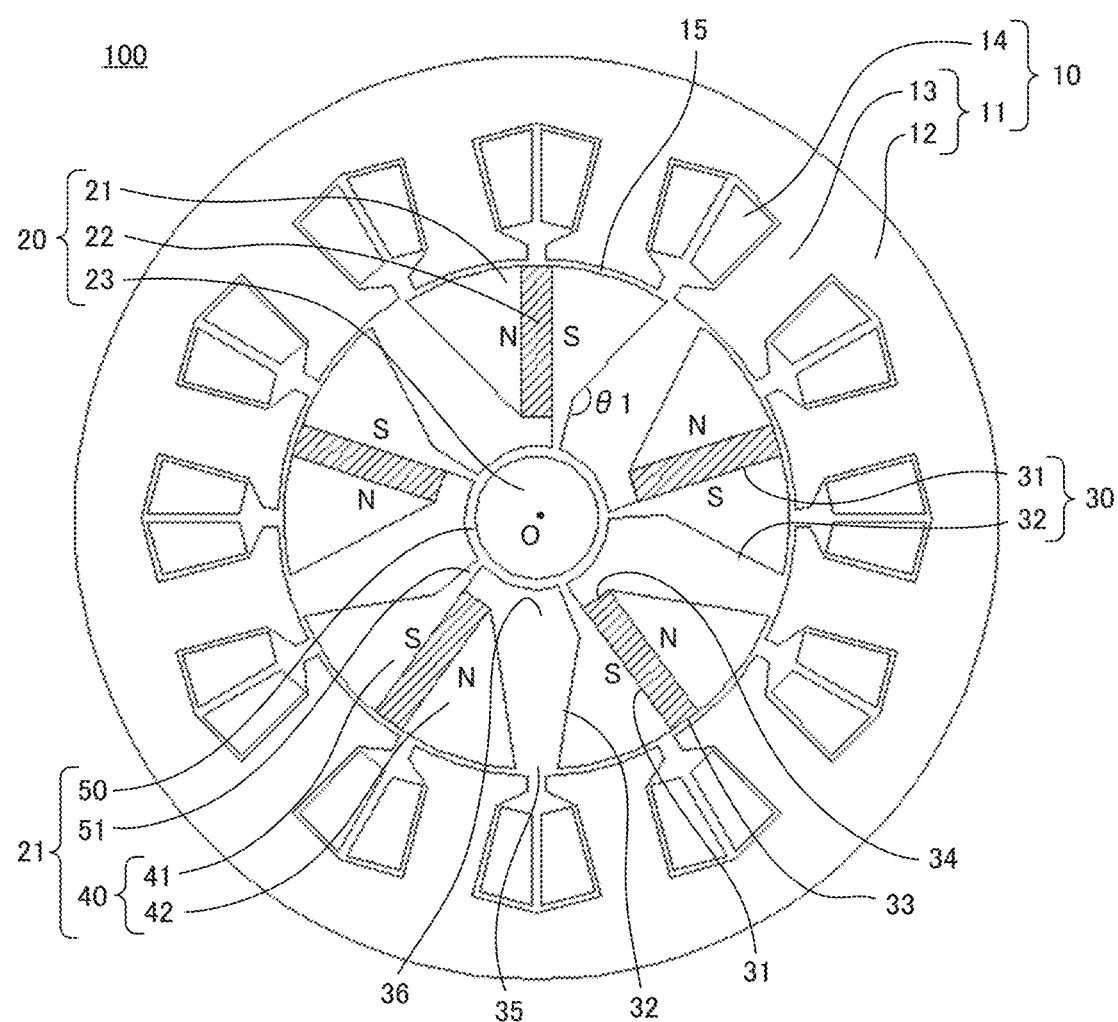
FIG. 1 is a sectional view for illustrating a configuration of a rotating electric machine as a basis of a first embodiment, which is taken perpendicularly to an axial direction.

A rotating electric machine according to a first embodiment is described. First, a rotating electric machine as a basis of the first embodiment is described. FIG. 1 is a sectional view for illustrating a configuration of the rotating electric machine as a basis of this embodiment, which is taken perpendicularly to an axial direction. Here, a direction along an axial center O of a rotor 20 is defined as an axial direction. A direction along a radius of the rotor 20 in a cross section of the rotor 20 perpendicular to the axial direction is defined as a radial direction. A direction along a rotating direction of the rotor 20, that is, a direction along a circumference about the axial center O in the cross section described above is defined as a circumferential direction.

As illustrated in FIG. 1, a rotating electric machine 100 includes a stator 10, and the rotor 20 provided on an inner peripheral side of the stator 10 so as to be rotatable with respect to the stator 10. A gap 15 serving as a magnetic gap is defined between the stator 10 and the rotor 20.

The stator 10 is provided so as to surround an outer periphery of the rotor 20. The stator 10 includes a stator core 11 and a plurality of windings 14. The stator core 11 includes a core back 12 formed in an annular shape, and a plurality of teeth 13 protruding from the core back 12 toward an inner peripheral side. The plurality of windings 14 are wound around the plurality of teeth 13, respectively, by a concentrated winding method. In the configuration illustrated in FIG. 1, twelve teeth 13 and twelve windings 14 are provided.

Figure 2:
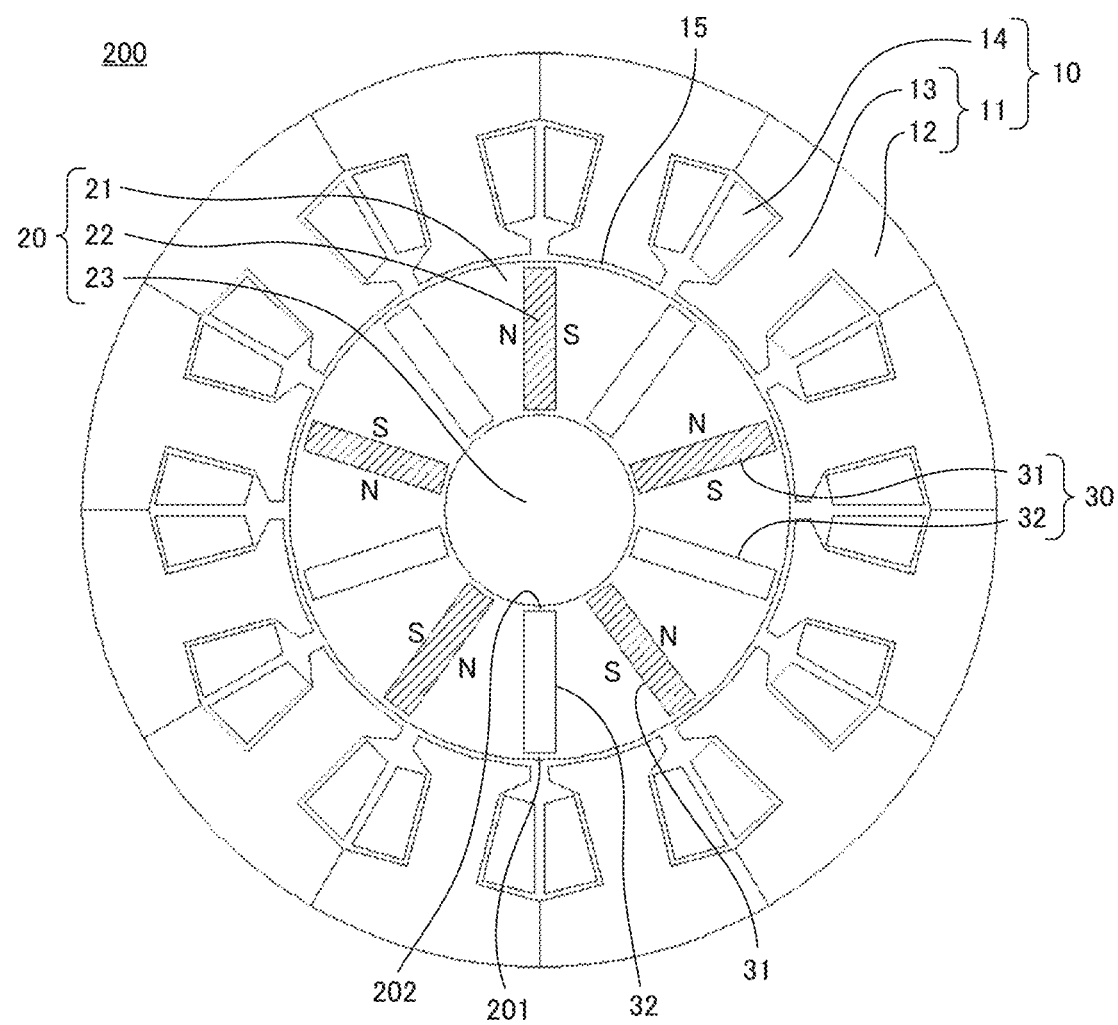
FIG. 2 is a sectional view for illustrating a configuration of a rotating electric machine according to a first comparative example of the first embodiment, which is taken perpendicularly to the axial direction.

As illustrated in FIG. 2 to be referred later, the core back 12 may have a configuration in which a plurality of core blocks each formed in an arc shape are coupled to each other in an annular shape. Further, the number of teeth 13 and the number of windings 14 are not limited to the above-mentioned number as long as the number nt of teeth 13 and the number nc of windings 14 satisfy a relationship of nc≤nt.

The rotor 20 includes a rotor core 21, a plurality of permanent magnets 22 provided inside the rotor core 21, and a shaft 23 provided on an inner peripheral side of the rotor core 21. The rotor 20 is an interior magnet rotor of vertical interior type in which the plurality of permanent magnets 22 are radially arranged inside the rotor core 21. The interior magnet rotor of vertical interior type may be referred to as a spoke rotor.

The rotor 20 is a consequent-pole rotor in which the number of permanent magnets 22 is smaller than the number of magnetic poles. The rotor 20 has p/2 permanent magnets 22 when the number of magnetic poles is "p". Here, "p" is an even number of two or more. In the configuration illustrated in FIG. 1, the number of magnetic poles "p" of the rotor 20 is ten, and hence the number of permanent magnets 22 is five.

The rotor core 21 has a configuration in which a plurality of core plates each made of a magnetic material are laminated in the axial direction. The rotor core 21 has a plurality of holes 30 penetrating in the axial direction. The plurality of holes 30 are arranged in the circumferential direction of the rotor 20. In the cross section of the rotor 20 perpendicular to the axial direction, the plurality of holes 30 are radially arranged such that a longitudinal direction of each of the plurality of holes 30 extends along the radial direction. The number of holes 30 is "p", which is equal to the number of magnetic poles of the rotor 20.

The permanent magnets 22 are inserted into some of the plurality of holes 30. That is, the plurality of holes 30 include a plurality of first holes 31 into which the permanent magnets 22 are inserted, and a plurality of second holes 32 into which the permanent magnets 22 are not inserted. The permanent magnets 22 are inserted only into the plurality of first holes 31 of the plurality of holes 30. The number of first holes 31 and the number of second holes 32 are both p/2. In the configuration illustrated in FIG. 1, the number of magnetic poles "p" is ten, and hence the number of first holes 31 and the number of second holes 32 are both five. The plurality of first holes 31 and the plurality of second holes 32 are alternately arranged one by one in the circumferential direction of the rotor 20. That is, the plurality of first holes 31 and the plurality of second holes 32 are alternately arranged one by one on the circumference about the axial center O of the rotor 20. In the configuration illustrated in FIG. 1, the shape of the first holes 31 and the shape of the second holes 32 are different from each other, but the shape of the first holes 31 and the shape of the second holes 32 may be the same.

The first hole 31 has an outer peripheral opening portion 33 and an inner peripheral opening portion 34. The outer peripheral opening portion 33 is opened toward an outer side in the radial direction, that is, the stator 10 side in the radial direction. The inner peripheral opening portion 34 is opened toward an inner side in the radial direction, that is, the shaft 23 side in the radial direction. That is, the first hole 31 is opened to both the outer side and the inner side in the radial direction.

The second hole 32 has an outer peripheral opening portion 35 and an inner peripheral opening portion 36. The outer peripheral opening portion 35 is opened toward the outer side in the radial direction, that is, the stator 10 side in the radial direction. The inner peripheral opening portion 36 is opened toward the inner side in the radial direction, that is, the shaft 23 side in the radial direction. That is, the second hole 32 is opened to both the outer side and the inner side in the radial direction. The outer peripheral opening portion 35 serves as a magnetic gap of a magnetic path along the circumferential direction at an outer peripheral portion of the rotor core 21. The inner peripheral opening portion 36 serves as a magnetic gap of a magnetic path along the circumferential direction at an inner peripheral portion of the rotor core 21. A circumferential width of the second hole 32 increases from the outer peripheral side toward the inner peripheral side. However, the circumferential width of the second hole 32 may be constant in the radial direction.

The inside of each of the second holes 32 is a space. Non-magnetic members made of a non-magnetic material, such as resin or non-magnetic metal, may be inserted into the inside of the second holes 32. The rotor core 21 may be held by the non-magnetic members inserted into the inside of the second holes 32.

The plurality of permanent magnets 22 inserted into the plurality of first holes 31, respectively, are radially arranged in the cross section of the rotor 20 perpendicular to the axial direction. In the same cross section, a longitudinal direction of each of the permanent magnets 22 extends along the radial direction of the rotor 20. The plurality of permanent magnets 22 are arranged in the circumferential direction. Two permanent magnets 22 adjacent to each other in the circumferential direction across the second hole 32 are magnetized such that two magnetic-pole surfaces facing each other in the circumferential direction have different poles. For example, each of the plurality of permanent magnets 22 is magnetized such that the magnetic-pole surface facing the counterclockwise direction in FIG. 1 becomes an N pole, and the magnetic-pole surface facing a clockwise direction in FIG. 1 becomes an S pole. A magnetization direction of each of the permanent magnets 22 extends along the circumferential direction of the rotor 20. Each of the permanent magnets 22 is fixed to the rotor core 21 using an adhesive or the like.

The rotor core 21 includes a plurality of core portions 40. In the cross section of the rotor 20 perpendicular to the axial direction, each of the plurality of core portions 40 has a fan shape. The plurality of core portions 40 are arranged in parallel in the circumferential direction with each of the plurality of second holes 32 defined therebetween. The number of core portions 40 is p/2. In the configuration illustrated in FIG. 1, the number of magnetic poles "p" is ten, and hence the number of core portions 40 is five. One second hole 32 is arranged between two core portions 40 adjacent to each other in the circumferential direction. In other words, each of the core portions 40 is located between two second holes 32 adjacent to each other in the circumferential direction.

One first hole 31 is formed in each of the plurality of core portions 40. That is, one permanent magnet 22 is provided to each of the plurality of core portions 40. In a cross section perpendicular to the axial direction, an outer peripheral end of the permanent magnet 22 is arranged at the outer peripheral opening portion 33, and forms an outer peripheral end of the core portion 40. In the same cross section, an inner peripheral end of the permanent magnet 22 is arranged at the inner peripheral opening portion 34, and forms an inner peripheral end of the core portion 40.

Each of the plurality of core portions 40 includes a first core portion 41 and a second core portion 42. The first core portion 41 is located on one magnetic-pole surface side of the permanent magnet 22. The second core portion 42 is located on the other magnetic-pole surface side of the permanent magnet 22. In the configuration illustrated in FIG. 1, the first core portion 41 is located on the S pole side of the permanent magnet 22 in each of the plurality of core portions 40, and the second core portion 42 is located on the N pole side of the permanent magnet 22 in each of the plurality of core portions 40. In the configuration illustrated in FIG. 1, five core portions 40 are provided, and hence five first core portions 41 and five second core portions 42 are provided.

In each of the plurality of core portions 40, the first core portion 41 and the second core portion 42 are bonded to each other using an adhesive or the like with the permanent magnet 22 interposed therebetween. The first core portion 41 is in contact with the S pole of the permanent magnet 22, and hence is magnetized to the S pole. The second core portion 42 is in contact with the N pole of the permanent magnet 22, and hence is magnetized to the N pole.

In at least the cross section illustrated in FIG. 1, the rotor core 21 further includes an annular portion 50 and a plurality of coupling portions 51. The annular portion 50 and the plurality of coupling portions 51 are formed so as to connect the plurality of core portions 40 to each other.

The annular portion 50 has an annular shape about the axial center O of the rotor 20, and is provided on the inner peripheral side with respect to the plurality of core portions 40. The annular portion 50 is formed such that the shaft 23 is inserted into the inner side of the annular portion 50. The shaft 23 is arranged on the axial center O of the rotor 20, and extends along the axial direction.

The plurality of coupling portions 51 extend radially from the annular portion 50 toward the first core portions 41 of the plurality of core portions 40, respectively. One end portion of each of the plurality of coupling portions 51 is connected to the annular portion 50. The other end portion of each of the plurality of coupling portions 51 is connected to, for example, an inner peripheral end portion of the first core portion 41. However, the other end portion of each of the plurality of coupling portions 51 may be connected to a portion of the first core portion 41 other than the inner peripheral end portion.

Each of the plurality of coupling portions 51 couples the annular portion 50 and each of the plurality of first core portions 41 to each other. With this, the plurality of first core portions 41 are magnetically connected to each other through the annular portion 50 and the plurality of coupling portions 51.

Meanwhile, each of the plurality of coupling portions 51 is not directly connected to the second core portion 42 of each of the plurality of core portions 40. In the cross section perpendicular to the axial direction, the second core portion 42 is connected to the coupling portion 51 and the annular portion 50 only through the first core portion 41 adjacent to the second core portion 42 across the permanent magnet 22.

FIG. 2 is a sectional view for illustrating a configuration of a rotating electric machine according to a first comparative example of this embodiment, which is taken perpendicularly to the axial direction. As illustrated in FIG. 2, a rotor 20 of a rotating electric machine 200 of this comparative example is different from the rotor 20 of the rotating electric machine 100 illustrated in FIG. 1 at least in that the second hole 32 does not have the outer peripheral opening portion 35 and the inner peripheral opening portion 36. In the rotor 20 of this comparative example, the radially outer sides of the second holes 32 are closed by a connecting portion 201, and the radially inner sides of the second holes 32 are closed by a connecting portion 202. The connecting portion 201 and the connecting portion 202 are a part of the rotor core 21, and are made of a magnetic material.

Figure 3:
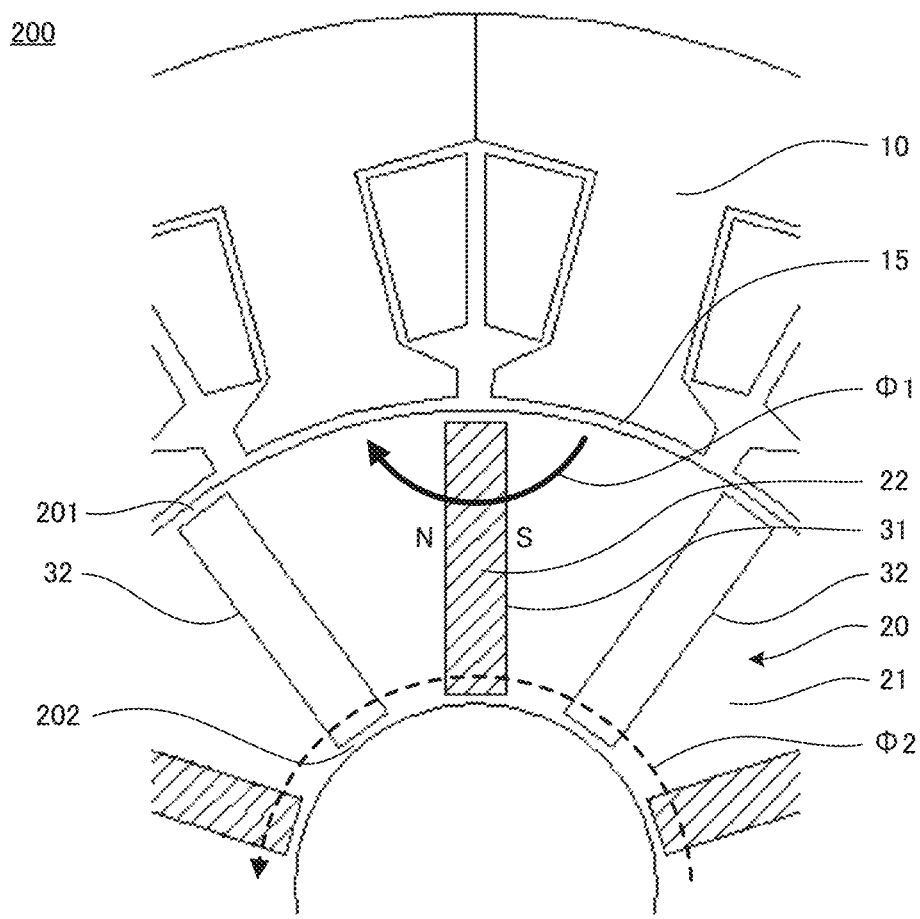
FIG. 3 is a view for illustrating a part of FIG. 2 in an enlarged manner.

FIG. 3 is a view for illustrating a part of FIG. 2 in an enlarged manner. In FIG. 3, an effective magnetic flux $\Phi 1$ that is interlinked with the stator 10 and contributes to torque of the rotating electric machine 200 is indicated by the solid line arrow, and a circumferential leakage magnetic flux $\Phi 2$ passing through a closed magnetic circuit in the circumferential direction, which is closed in the rotor core 21, is indicated by the broken line arrow.

The magnetic resistance of each of the connecting portion 201 closing the radially outer sides of the second holes 32 and the connecting portion 202 closing the radially inner sides of the second holes 32 is extremely smaller than the magnetic resistance of the gap 15. Thus, the closed magnetic circuit in the circumferential direction, which is closed in the rotor core 21, is actively formed, and a magnetic path that causes a magnetic flux to be interlinked with the stator 10 is less liable to be formed. With this, the circumferential leakage magnetic flux $\Phi 2$ passing through the connecting portion 202 or the connecting portion 201 relatively increases with respect to the amount of use of the permanent magnets 22, and hence the effective magnetic flux $\Phi 1$ that passes through the gap 15 and is interlinked with the stator 10 reduces. Thus, it has been difficult to improve torque output in the rotating electric machine 200 in a configuration as the first comparative example illustrated in FIG. 2 and FIG. 3.

Figure 4:
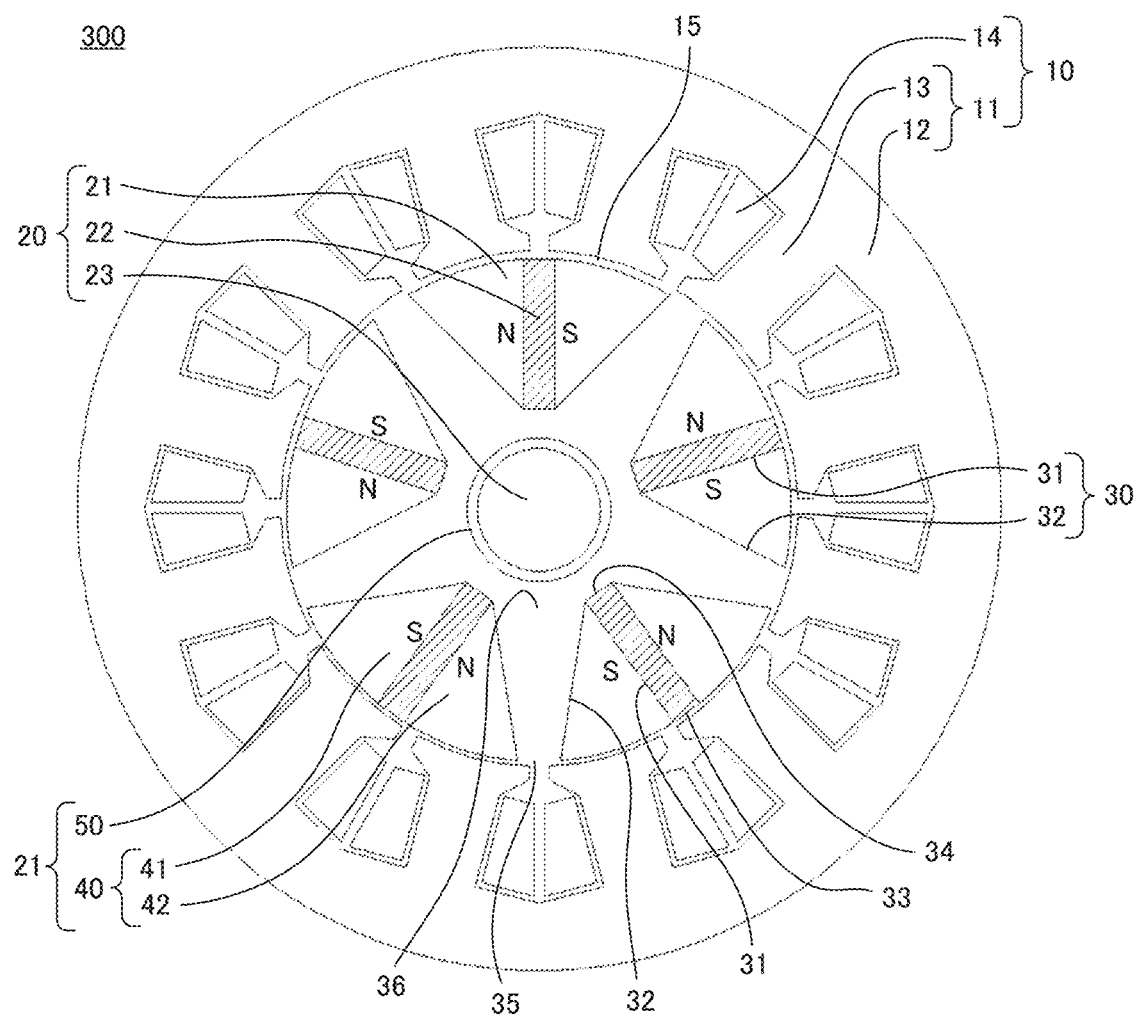
FIG. 4 is a sectional view for illustrating a configuration of a rotating electric machine according to a second comparative example of the first embodiment, which is taken perpendicularly to the axial direction.

FIG. 4 is a sectional view for illustrating a configuration of a rotating electric machine according to a second comparative example of this embodiment, which is taken perpendicularly to the axial direction. As illustrated in FIG. 4, similarly to the rotor 20 illustrated in FIG. 1, in a rotor 20 of a rotating electric machine 300 of this comparative example, the second hole 32 has the outer peripheral opening portion 35 and the inner peripheral opening portion 36. However, in the rotor 20 of this comparative example, unlike the rotor 20 illustrated in FIG. 1, the plurality of coupling portions 51 coupling the annular portion 50 and the plurality of first core portions 41 to each other are not formed.

Figure 5:
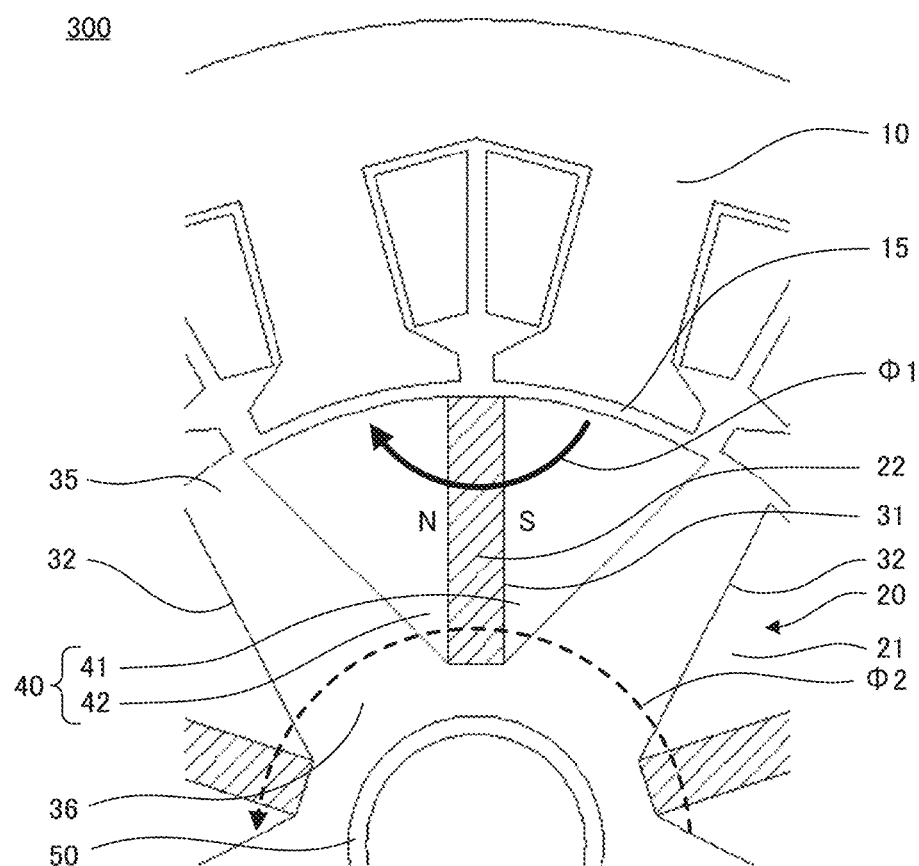
FIG. 5 is a view for illustrating a part of FIG. 4 in an enlarged manner.

FIG. 5 is a view for illustrating a part of FIG. 4 in an enlarged manner. In FIG. 5, similarly to FIG. 3, an effective magnetic flux $\Phi 1$ is indicated by the solid line arrow, and a circumferential leakage magnetic flux $\Phi 2$ is indicated by the broken line arrow. As illustrated in FIG. 5, a closed magnetic circuit in the circumferential direction, which is closed in the rotor core 21, always passes through the second hole 32, and hence the magnetic resistance of the closed magnetic circuit in the circumferential direction increases. With this, the circumferential leakage magnetic flux $\Phi 2$ can be reduced, and the effective magnetic flux $\Phi 1$ interlinked with the stator 10 can be increased. In particular, when the circumferential width of the second hole 32 increases toward the inner peripheral side, the circumferential leakage magnetic flux $\Phi 2$ closer to the inner periphery of the rotor core 21 can be effectively reduced.

However, in the configuration of the second comparative example illustrated in FIG. 4 and FIG. 5, the plurality of coupling portions 51 coupling the annular portion 50 and the plurality of first core portions 41 to each other are not formed, and hence it has been difficult to transmit torque between the rotor core 21 and the shaft 23.

In contrast, in the rotating electric machine 100 illustrated in FIG. 1, the annular portion 50 and the plurality of first core portions 41 are physically coupled to each other by the plurality of coupling portions 51, respectively. Thus, torque can be reliably transmitted between the rotor core 21 and the shaft 23.

Figure 6:
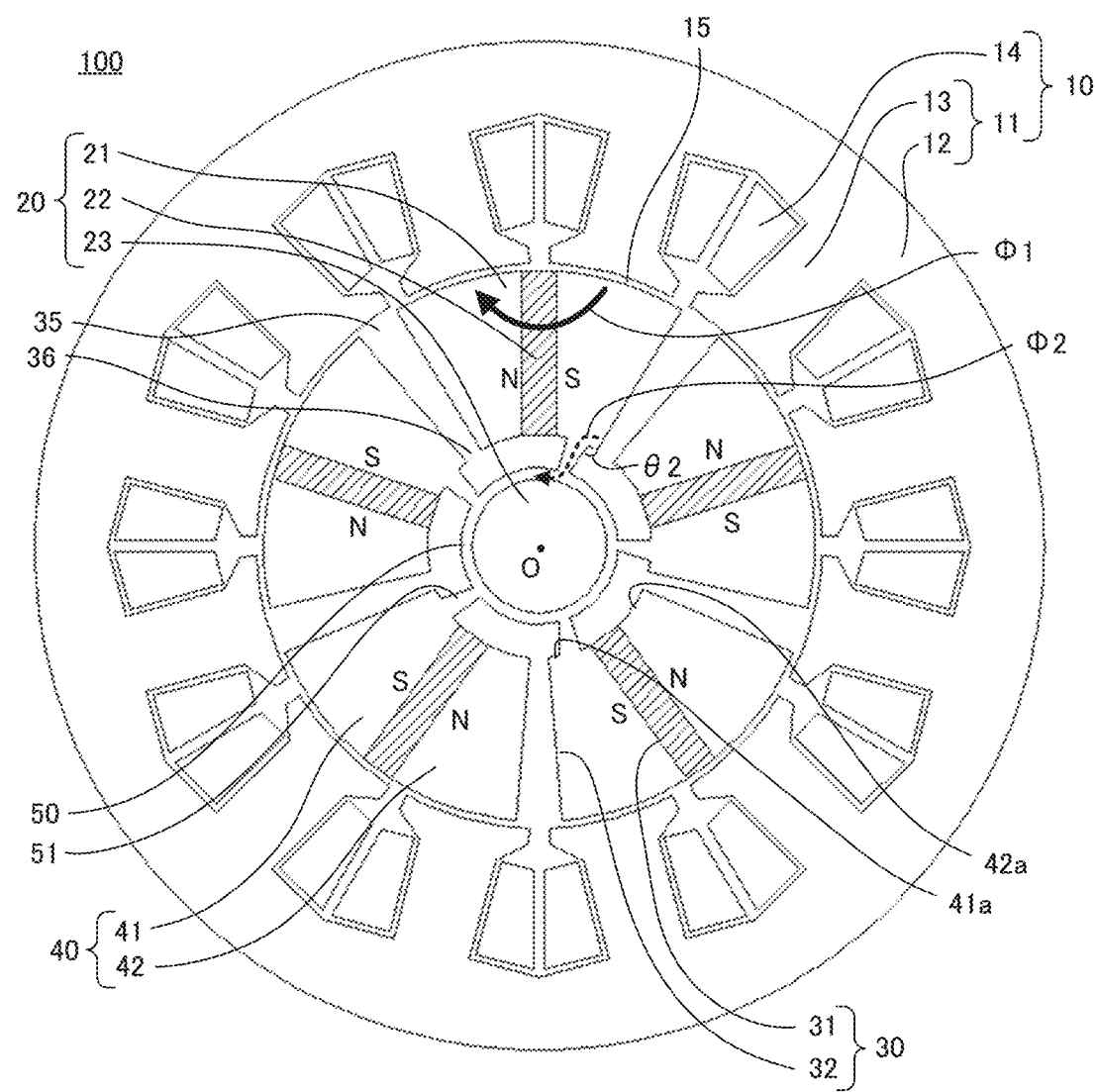
FIG. 6 is a sectional view for illustrating a configuration of another rotating electric machine as a basis of the first embodiment, which is taken perpendicularly to the axial direction.

FIG. 6 is a sectional view for illustrating a configuration of another rotating electric machine as a basis of this embodiment, which is taken perpendicularly to the axial direction. The shapes of the core portions 40 and the second holes 32 illustrated in FIG. 6 are different from the shapes of the core portions 40 and the second holes 32 illustrated in FIG. 1. In the configuration illustrated in FIG. 6, the first core portion 41 of the core portion 40 has an inner peripheral surface 41a having a partially cylindrical surface shape about the axial center O of the rotor 20 at an inner peripheral end thereof. Similarly, the second core portion 42 of the core portion 40 has an inner peripheral surface 42a having a partially cylindrical surface shape about the axial center O of the rotor 20 at an inner peripheral end thereof. The coupling portion 51 is connected to a position closer to the permanent magnet 22 in the inner peripheral surface 41a of the first core portion 41.

In the configuration illustrated in FIG. 1, in a joining portion between the coupling portion 51 and the first core portion 41, an angle $\theta 1$ formed by a side surface of the coupling portion 51 and a side surface of the first core portion 41 is an obtuse angle. In contrast, in the configuration illustrated in FIG. 6, in the joining portion between the coupling portion 51 and the first core portion 41, an angle θ2 formed by the side surface of the coupling portion 51 and the inner peripheral surface 41a of the first core portion 41 is an obtuse angle, but is smaller than the angle θ1. In order to avoid stress concentration in the joining portion between the coupling portion 51 and the first core portion 41, as in the configuration illustrated in FIG. 1, it is desired that the angle θ1 formed by the side surface of the coupling portion 51 and the side surface of the first core portion 41 be an obtuse angle and a larger angle.

In FIG. 6, similarly to FIG. 3, an effective magnetic flux Φ1 is indicated by the solid line arrow, and a circumferential leakage magnetic flux Φ2 is indicated by the broken line arrow. As illustrated in FIG. 6, a closed magnetic circuit in the circumferential direction, which is closed in the rotor core 21, passes through the coupling portions 51 and the annular portion 50. Further, similarly in the configuration illustrated in FIG. 1, a closed magnetic circuit in the circumferential direction, which is closed in the rotor core 21, passes through the coupling portions 51 and the annular portion 50. With the configurations illustrated in FIG. 1 and FIG. 6, the circumferential leakage magnetic flux Φ2 can be reduced at least in a portion closer to the outer periphery of the rotor core 21. Thus, the effective magnetic flux Φ1 interlinked with the stator 10 can be increased.

Further, in the configurations illustrated in FIG. 1 and FIG. 6, the plurality of first core portions 41 magnetized to the same pole are coupled to each other through the coupling portions 51 and the annular portion 50, thereby being capable of also reducing the circumferential leakage magnetic fluxes Φ2 passing through the coupling portions 51 and the annular portion 50. With this, the effective magnetic fluxes Φ1 interlinked with the stator 10 can be further increased. Thus, according to the rotating electric machine 100 as a basis of this embodiment as illustrated in FIG. 1 and FIG. 6, torque output can be improved as compared to the rotating electric machine 200 of the first comparative example illustrated in FIG. 2 and FIG. 3.

Figure 7:
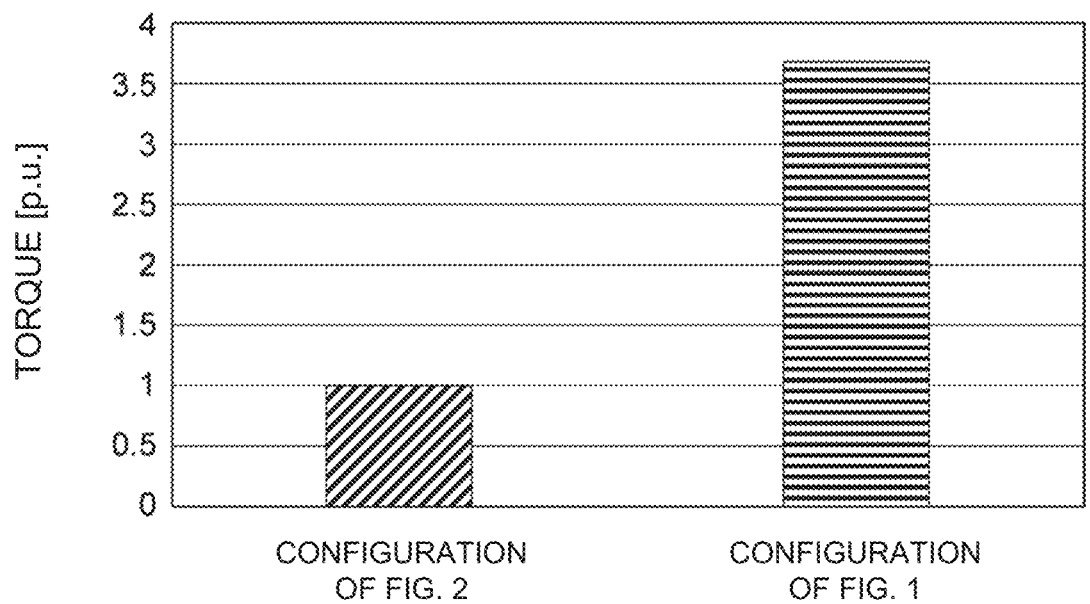
FIG. 7 is a graph for showing torque obtained in the rotating electric machine as a basis of the first embodiment and torque obtained in the rotating electric machine of the first comparative example.

FIG. 7 is a graph for showing torque obtained in the rotating electric machine as a basis of this embodiment and torque obtained in the rotating electric machine of the first comparative example. The vertical axis in the graph represents torque [p.u.] normalized with the torque obtained in the rotating electric machine 200 of the first comparative example as 1. "CONFIGURATION OF FIG. 2" in FIG. 7 represents the rotating electric machine 200 of the first comparative example, and "CONFIGURATION OF FIG. 1" represents the rotating electric machine 100 as a basis of this embodiment.

As shown in FIG. 7, when the torque obtained in the rotating electric machine 200 of the first comparative example is 1, the torque obtained in the rotating electric machine 100 as a basis of this embodiment is about 3.66. Thus, it is understood that, in the rotating electric machine 100 as a basis of this embodiment, torque higher than that in the rotating electric machine 200 of the first comparative example is obtained.

Figure 8:
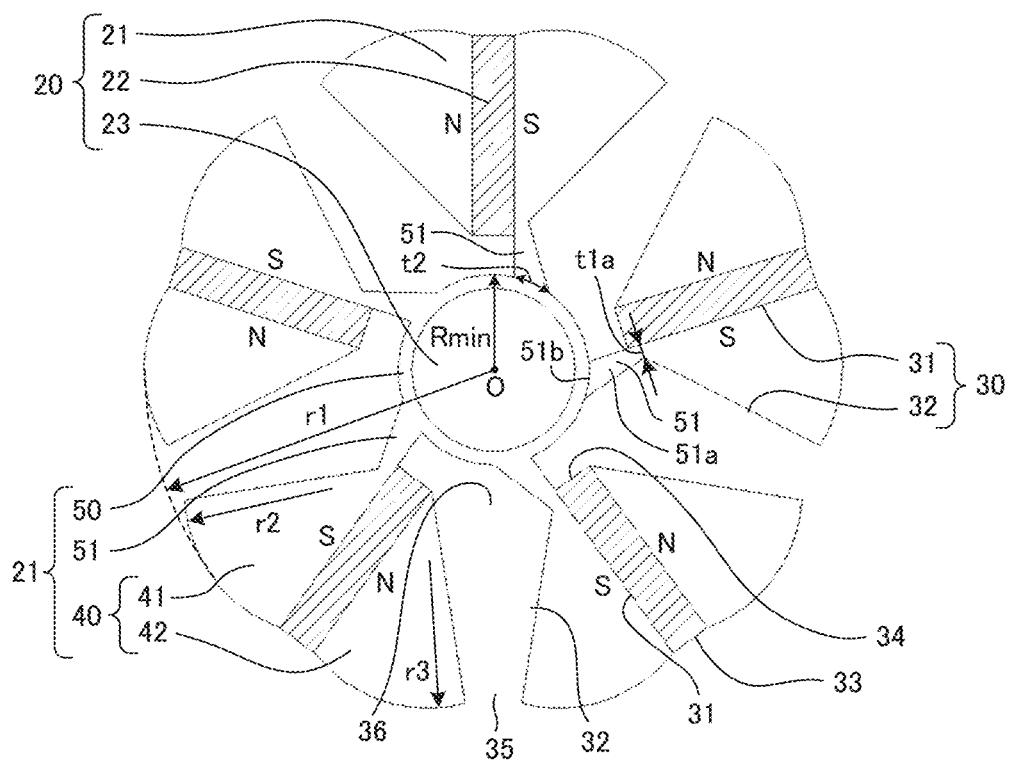
FIG. 8 is a sectional view for illustrating a configuration of a rotor for the rotating electric machine according to the first embodiment, which is taken perpendicularly to the axial direction.

FIG. 8 is a sectional view for illustrating a configuration of the rotor for the rotating electric machine according to this embodiment, which is taken perpendicularly to the axial direction. Although not illustrated in FIG. 8, the stator 10 is provided on the outer peripheral side of the rotor 20 with the gap 15 defined therebetween. As illustrated in FIG. 8, in the rotor 20 in this embodiment, the circumferential width of the coupling portion 51 is non-uniform in the radial direction of the rotor 20.

In the cross section illustrated in FIG. 8, the coupling portion 51 includes one coupling path 51a. The coupling path 51a forms a path of a magnetic path formed in the coupling portion 51. As described later with reference to FIG. 15, the coupling portion 51 may include a plurality of coupling paths 51a and 51c provided in parallel to each other.

Figure 28:
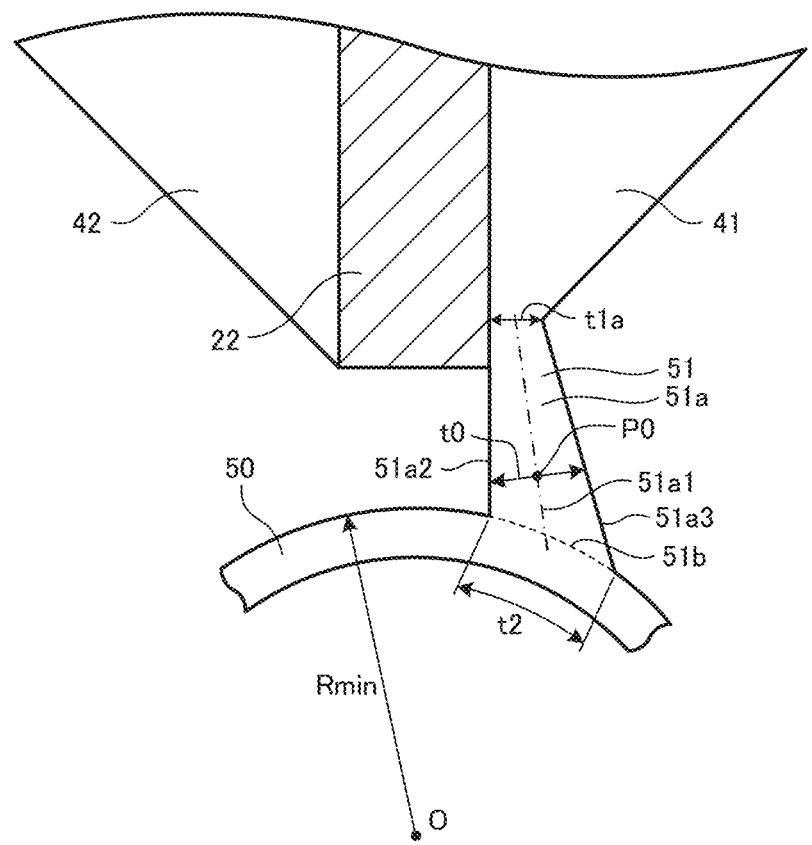
FIG. 28 is an explanatory view for illustrating a width of a coupling path.

Here, a width of the coupling path 51a in the cross section illustrated in FIG. 8 is described with reference to FIG. 28. FIG. 28 is an explanatory view for illustrating the width of the coupling path. The width of the coupling path 51a is determined on each point on a center line 51a1 of the coupling path 51a. The center line 51a1 is a line connecting the annular portion 50 and the first core portion 41 to each other while passing through the center of the coupling path 51a.

A width of the coupling path 51a on a freely-selected point P0 on the center line 51a1 is t0. The width t0 of the coupling path 51a at the point P0 is a length of a straight line having the shortest length among straight lines that pass through the point P0 and connect one side surface 51a2 and the other side surface 51a3 of the coupling path 51a to each other. The smallest width among widths of the coupling path 51a at all points on the center line 51a1 is t1a. That is, the width t1a is a width of a portion having the smallest width in the coupling path 51a.

The sum of a width of a portion having the smallest width in at least one coupling path of the coupling portion 51 is t1. In the configuration illustrated in FIG. 8, the coupling portion 51 has one coupling path 51a, and hence the sum t1 of the width is equal to the width t1a (t1=t1a).

In the cross section illustrated in FIG. 8, a boundary having an arc shape between the inner peripheral portion of the coupling portion 51 and the outer peripheral portion of the annular portion 50 is hereinafter referred to as a joining boundary 51b. A circumferential width of the joining boundary 51b, that is, a length t2 of the joining boundary 51b along the arc corresponds to a length of an arc overlapping the coupling portion 51 in a circle having a radius Rmin about the axial center O. The radius Rmin is a minimum radius of the coupling portion 51 about the axial center O.

The sum t1 of the width of the portion having the smallest width in at least one coupling path of the coupling portion 51 is smaller than the length t2 of the joining boundary 51b (t1<t2).

Here, the outer peripheral portion of the rotor 20 illustrated in FIG. 8 has a non-true circular shape in a cross section perpendicular to the axial direction. The outer peripheral surface of each of the first core portion 41 and the second core portion 42 has an arc shape about a position different from the axial center of the rotor 20. When a radius of a circumscribed circle that is circumscribed about the rotor core 21 is r1, a radius of the outer peripheral surface of the first core portion 41 is r2, and a radius of the outer peripheral surface of the second core portion 42 is r3, a relationship of r1>r2=r3 is satisfied. The rotor 20 has such a shape, thereby reducing cogging torque and torque ripple. However, similarly to the rotor 20 illustrated in FIG. 1 or the like, the rotor 20 in this embodiment may have a true circular shape in a cross section perpendicular to the axial direction.

Figure 9:
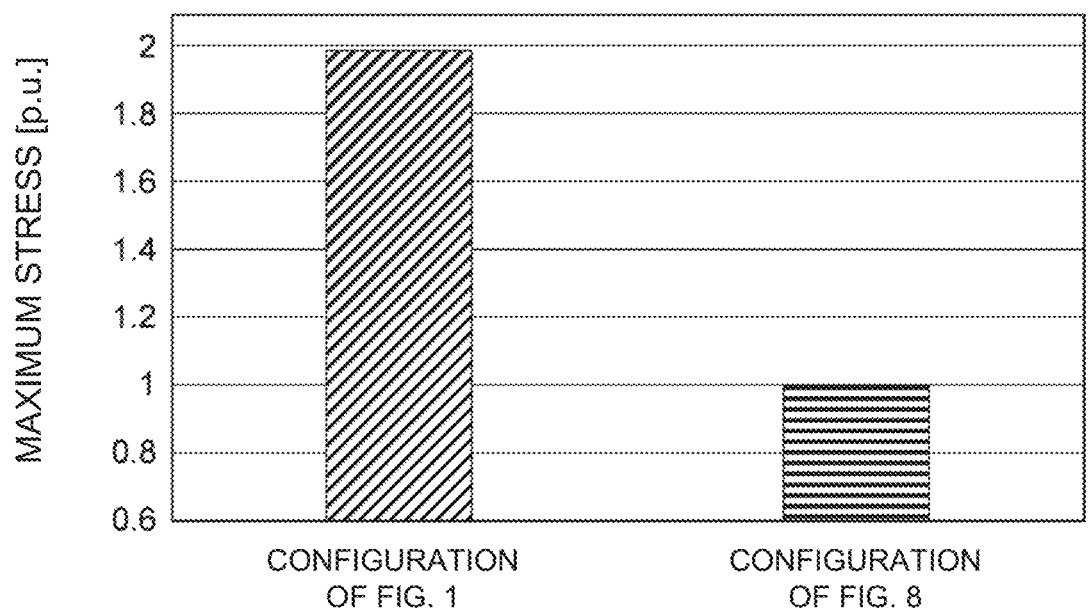
FIG. 9 is a graph for showing maximum stress generated in a coupling portion during rotation in a rotor having the configuration illustrated in FIG. 1 and maximum stress generated in a coupling portion during rotation in the rotor having the configuration illustrated in FIG. 8.

FIG. 9 is a graph for showing maximum stress generated in the coupling portion during rotation in the rotor having the configuration illustrated in FIG. 1 and maximum stress generated in the coupling portion during rotation in the rotor having the configuration illustrated in FIG. 8. The vertical axis in the graph represents stress [p.u.] normalized with maximum stress generated in the coupling portion 51 during rotation in the rotor 20 having the configuration illustrated in FIG. 8 as 1.

As shown in FIG. 9, when the maximum stress generated in the coupling portion 51 during rotation in the rotor 20 having the configuration illustrated in FIG. 8 is 1, the maximum stress generated in the coupling portion 51 during rotation in the rotor 20 having the configuration illustrated in FIG. 1 is about 2.0. Thus, it is understood that, in the configuration illustrated in FIG. 8, as compared to the configuration illustrated in FIG. 1, the maximum stress generated in the coupling portion 51 can be reduced, and stress concentration can be relaxed.

When the circumferential width of the coupling portion 51 is reduced, the magnetic resistance of the coupling portion 51 is increased, thereby being capable of reducing the circumferential leakage magnetic flux Φ2. However, during rotation of the rotor 20, large stress is generated in the joining boundary 51b between the annular portion 50 and the coupling portion 51, and hence it is difficult to reduce the circumferential width of the joining boundary 51b.

In the configuration of this embodiment illustrated in FIG. 8, the length t2 of the joining boundary 51b is larger than the sum t1 of the width of the portion having the smallest width in at least one coupling path of the coupling portion 51. With this, the circumferential width of the joining boundary 51b between the annular portion 50 and the coupling portion 51 can be increased, thereby being capable of relaxing stress concentration in the joining boundary 51b. Thus, with the configuration of this embodiment illustrated in FIG. 8, the strength of the rotor 20 can be improved.

Meanwhile, in a portion of the coupling portion 51 away from the joining boundary 51b, the circumferential width of the coupling portion 51 can be reduced. With this, the magnetic resistance of the coupling portion 51 can be increased, thereby being capable of reducing the circumferential leakage magnetic flux Φ2. Thus, with the configuration of this embodiment illustrated in FIG. 8, as compared to the rotating electric machine 100 as a basis of this embodiment as illustrated in FIG. 1 and FIG. 6, the effective magnetic flux Φ1 can be further increased, thereby being capable of further improving torque of the rotating electric machine.

The amount of magnetic flux passing through the magnetic path is determined by the smallest width among the series of paths of the magnetic path. Specifically, flux density saturation occurs in a portion having the smallest width in the coupling path 51a, and magnetic permeability becomes lower so that the magnetic flux is less likely to pass. Thus, in order to reduce the amount of magnetic flux passing through the coupling portion 51, it is desired that the width of the coupling path 51a be as small as possible.

On the other hand, in the rotor core 21, a dangerous cross section relating to the strength in structure is the joining boundary 51b having an arc shape between the outer peripheral portion of the annular portion 50 and the coupling portion 51. Thus, in order to increase the strength of the rotor core 21, it is preferred that the length of the joining boundary 51b be as large as possible.

From the above, the width of the portion having the smallest width in the coupling path 51a is reduced in order to reduce the amount of magnetic flux passing through the coupling portion 51 while increasing the length of the joining boundary 51b as much as possible in order to increase the strength, thereby being capable of reducing the leakage magnetic flux while increasing the strength. Thus, the sum t1 of the width of the portion having the smallest width in at least one coupling path 51a is at least smaller than the length t2 of the joining boundary 51b.

Further, it is desired that the width t1a of the portion having the smallest width in each coupling path 51a be equal to or larger than a thickness of a magnetic steel sheet forming the rotor core 21. Further, when the number of magnetic poles is "p", the length t2 of the joining boundary 51b can be increased to a length obtained by dividing the length of the circumference having the radius Rmin by p/2.

As described above, the sum t1 of the width of the portion having the smallest width in at least one coupling path 51a is compared with the length t2 of the joining boundary 51b. Thus, the structure capable of relaxing stress concentration in the joining boundary 51b while reducing the circumferential leakage magnetic flux Φ2 can be obtained.

That is, with the configuration of this embodiment illustrated in FIG. 8, it is possible to improve both the torque of the rotating electric machine and the strength of the rotor 20.

Figure 10:
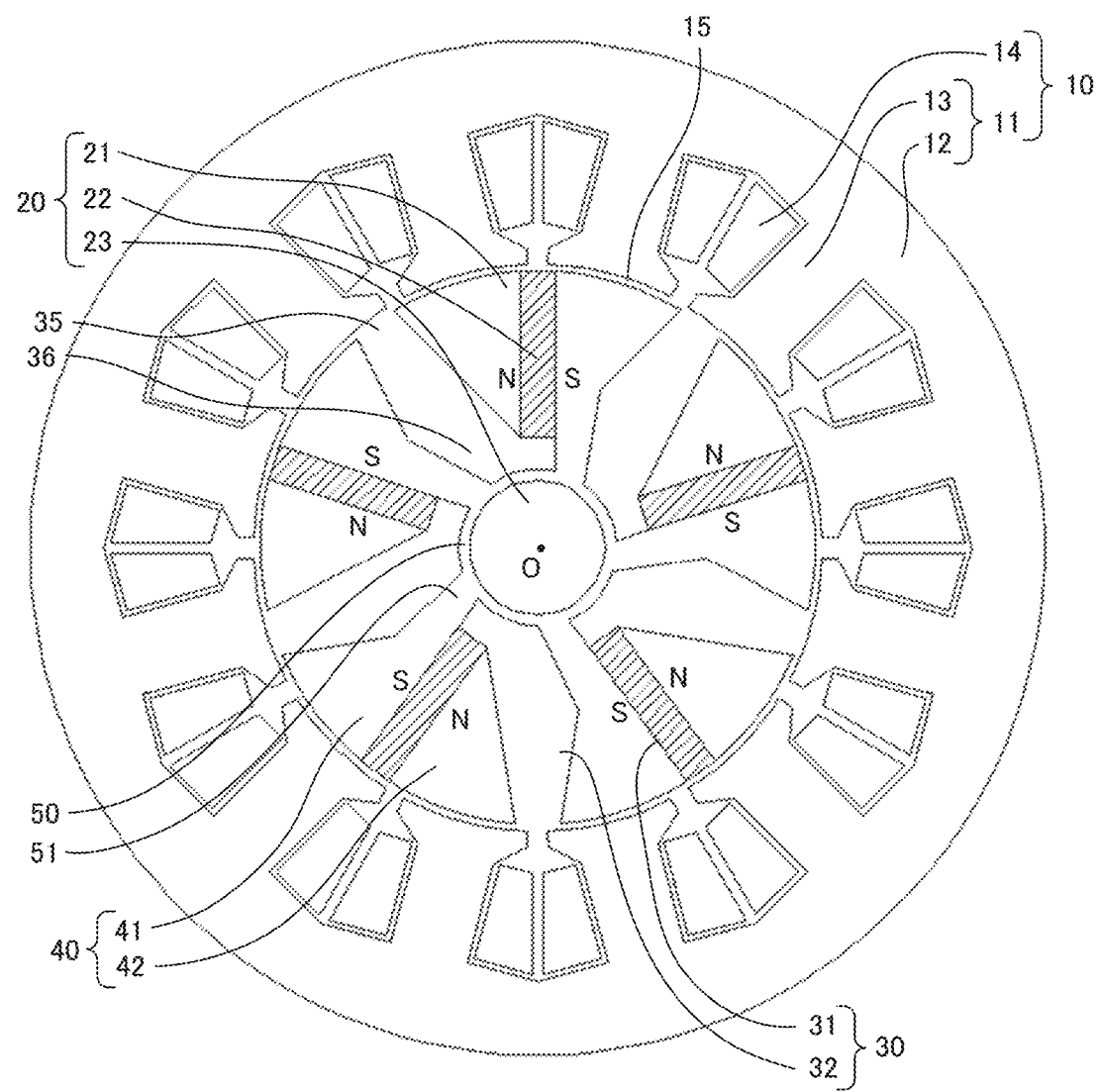
FIG. 10 is a sectional view for illustrating a configuration of a rotor for a rotating electric machine according to a third comparative example of the first embodiment, which is taken perpendicularly to the axial direction.

FIG. 10 is a sectional view for illustrating a configuration of a rotor for a rotating electric machine according to a third comparative example of this embodiment, which is taken perpendicularly to the axial direction. As illustrated in FIG. 10, in the rotor 20 of the third comparative example, the circumferential width of the coupling portion 51 increases from the inner peripheral side toward the outer peripheral side.

Figure 11:
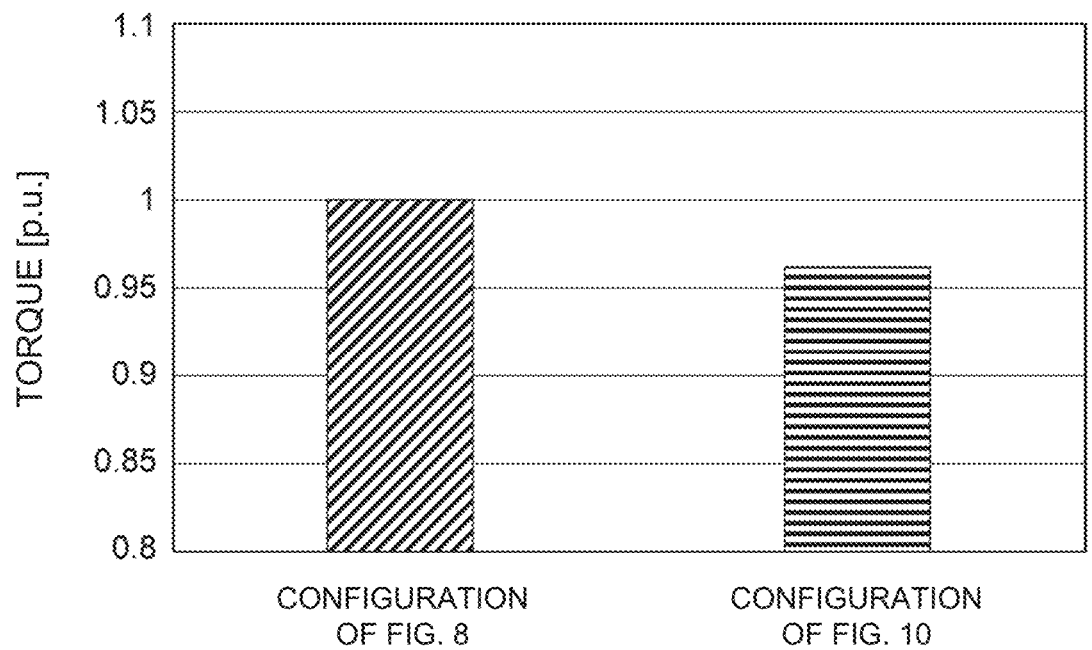
FIG. 11 is a graph for showing torque obtained in the rotating electric machine including the rotor having the configuration illustrated in FIG. 8 and torque obtained in the rotating electric machine including the rotor having the configuration illustrated in FIG. 10.

FIG. 11 is a graph for showing torque obtained in the rotating electric machine including the rotor having the configuration illustrated in FIG. 8 and torque obtained in the rotating electric machine including the rotor having the configuration illustrated in FIG. 10. The vertical axis in the graph represents torque [p.u.] normalized with the torque obtained in the rotating electric machine including the rotor 20 having the configuration illustrated in FIG. 8 as 1.

As shown in FIG. 11, when the torque obtained in the rotating electric machine including the rotor 20 having the configuration illustrated in FIG. 8 is 1, the torque obtained in the rotating electric machine including the rotor having the configuration illustrated in FIG. 10 is 0.96. Thus, it is understood that, in the rotating electric machine of this embodiment including the rotor 20 having the configuration illustrated in FIG. 8, higher average torque is obtained as compared to the rotating electric machine of the third comparative example including the rotor 20 having the configuration illustrated in FIG. 10.

Figure 12:
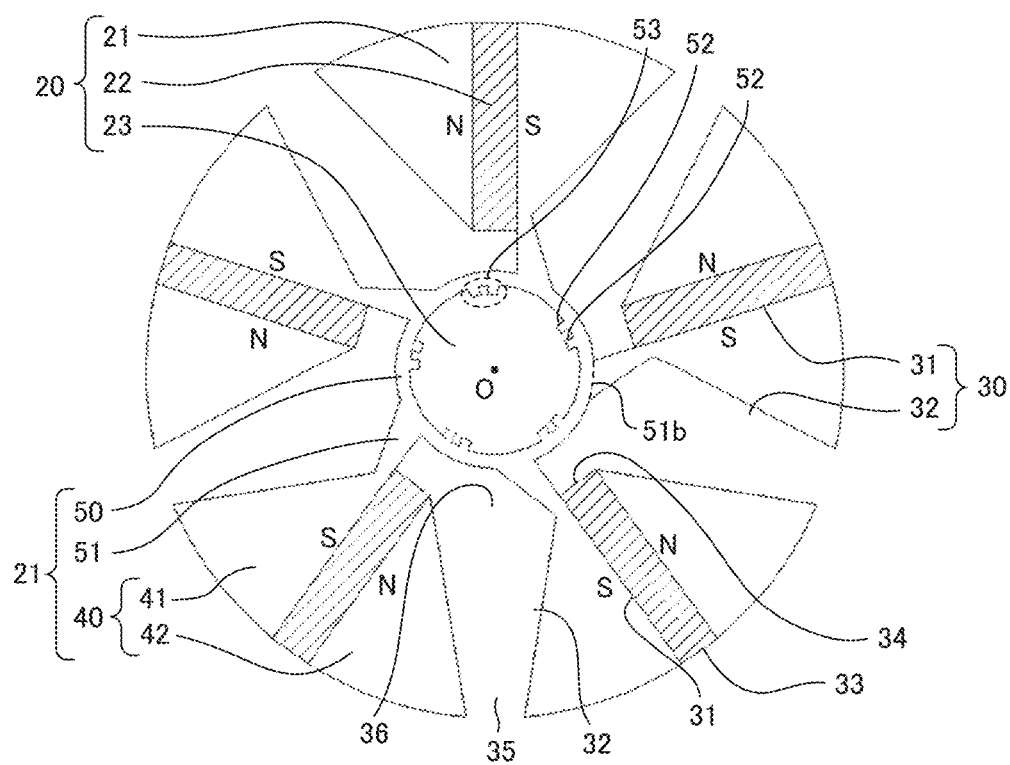
FIG. 12 is a sectional view for illustrating a configuration of a rotor for a rotating electric machine according to a modification example 1-1 of the first embodiment, which is taken perpendicularly to the axial direction.
Figure 13:
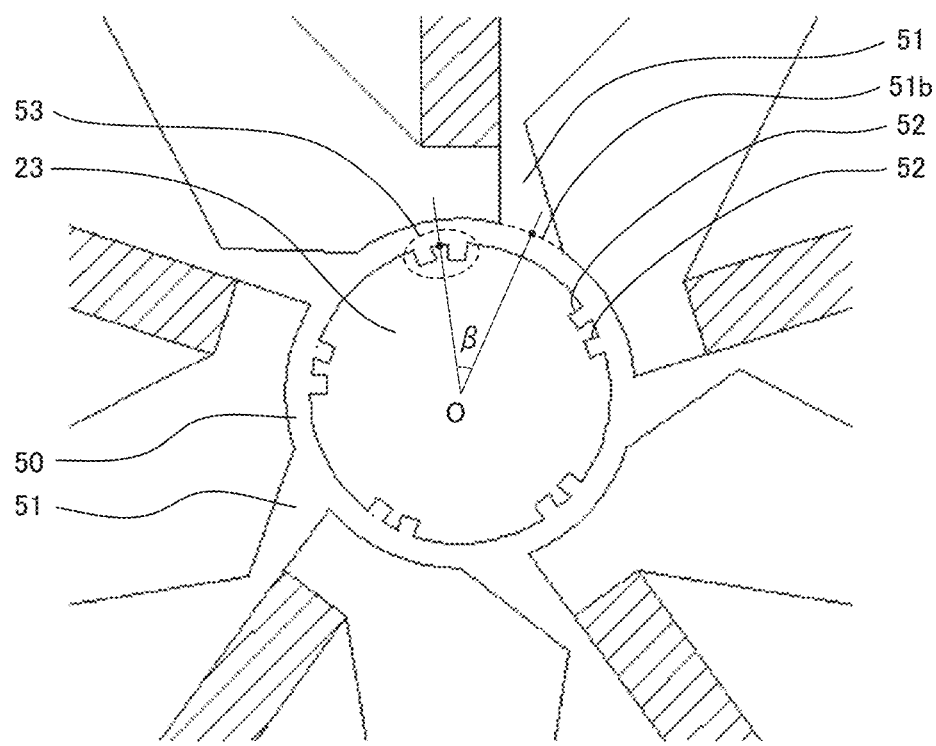
FIG. 13 is a view for illustrating a part of FIG. 12 in an enlarged manner.

FIG. 12 is a sectional view for illustrating a configuration of a rotor for a rotating electric machine according to a modification example 1-1 of this embodiment, which is taken perpendicularly to the axial direction. FIG. 13 is a view for illustrating a part of FIG. 12 in an enlarged manner. As illustrated in FIG. 12 and FIG. 13, an annular portion 50 in this modification example includes a plurality of protrusions 52. The plurality of protrusions 52 are formed on the inner peripheral surface of the annular portion 50, and protrude to the inner peripheral side. Each of the plurality of protrusions 52 is in contact with the outer peripheral surface of the shaft 23 inserted into the annular portion 50, and is crushed by the shaft 23. The shaft 23 has a true circular shape in cross section.

The shape of each of the plurality of protrusions 52 illustrated in FIG. 12 and FIG. 13 is that before being crushed by the shaft 23 inserted into the annular portion 50. Before the shaft 23 is inserted into the annular portion 50, each of the plurality of protrusions 52 has, for example, a rectangular shape in cross section. However, the shape of each of the plurality of protrusions 52 may be any shape.

Each of the plurality of protrusions 52 is arranged at a position shifted from at least the joining boundary 51b in the coupling portion 51 in the circumferential direction of the rotor 20. That is, when viewed along the radial direction of the rotor 20, each of the plurality of protrusions 52 is arranged so as not to overlap any of the plurality of joining boundaries 51b.

The annular portion 50 has a plurality of protrusion groups 53 each including at least one protrusion 52. In the configuration illustrated in FIG. 12 and FIG. 13, each of the plurality of protrusion groups 53 includes two protrusions 52. The plurality of protrusion groups 53 are arranged in the circumferential direction. When the number of magnetic poles of the rotor 20 is "p", the number of protrusion groups 53 is p/2. That is, the number of protrusion groups 53 is equal to the number of coupling portions 51. Each of the plurality of protrusion groups 53 is provided between two coupling portions 51 adjacent to each other in the circumferential direction. When an angle formed by a center portion of the protrusion group 53 in the circumferential direction and a center portion of the joining boundary 51b in the circumferential direction is β, a relationship of β>0 is satisfied. The plurality of protrusion groups 53 are not required to be arranged at equal intervals.

For example, when the number of pole pairs of the rotor 20 is P (P=2×p), the annular portion 50 has one protrusion group 53 for each angular range of 360/P degrees about the axial center O of the rotor 20. In other words, the annular portion 50 has N protrusions 52 for each angular range of 360/P degrees about the axial center O of the rotor 20. Here, N is an integer of 1 or more.

In a manufacturing process of the rotor 20, when the shaft 23 is inserted into the annular portion 50, the annular portion 50 receives stress from the shaft 23. Meanwhile, during rotation of the rotor 20, larger stress is generated in the joining boundary 51b than other portions. Thus, during rotation of the rotor 20, stress equal to or higher than a yield point may be generated in the joining boundary 51b.

In contrast, in the annular portion 50 in this modification example, the protrusions 52 that receive stress from the shaft 23 are formed at positions shifted from the joining boundaries 51b. With this, the joining boundary 51b is less liable to receive stress from the shaft 23, thereby being capable of relaxing stress concentration in the joining boundary 51b. Thus, the stress generated in the joining boundary 51b can be made less than the yield point, thereby being capable of improving the strength of the rotor 20.

Further, in this modification example, the plurality of protrusions 52 are formed on the inner peripheral surface of the annular portion 50 so that stress received from the shaft 23 can be concentrated on each of the plurality of protrusions 52. With this, in a portion in which the protrusions 52 are not formed, the radial thickness of the annular portion 50 can be reduced. Thus, the circumferential leakage magnetic flux Φ2 can be further reduced, and the effective magnetic flux Φ1 can be further increased. Thus, according to this modification example, the torque of the rotating electric machine can be further improved.

Further, in this modification example, fastening margin tolerance required for press-fitting the shaft 23 into the annular portion 50 can be relaxed.

Figure 14:
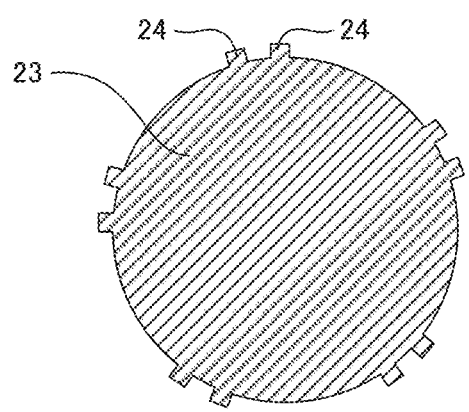
FIG. 14 is a sectional view for illustrating a configuration of a shaft of a rotating electric machine according to a modification example 1-2 of the first embodiment, which is taken perpendicularly to the axial direction.

FIG. 14 is a sectional view for illustrating a configuration of a shaft of a rotating electric machine according to a modification example 1-2 of this embodiment, which is taken perpendicularly to the axial direction. As illustrated in FIG. 14, a plurality of protrusions 24 are formed on an outer peripheral surface of a shaft 23. Each of the plurality of protrusions 24 protrudes from the outer peripheral surface of the shaft 23 to the outer peripheral side, and is in contact with the inner peripheral surface of the annular portion 50 (not shown in FIG. 14). The inner peripheral surface of the annular portion 50 has, for example, a true circular shape in cross section.

That is, in the modification example 1-1, the protrusions 52 are formed on the inner peripheral surface of the annular portion 50, whereas, in this modification example, the protrusions 24 are formed on the outer peripheral surface of the shaft 23. It is desired that each of the plurality of protrusions 24 be arranged at positions shifted from each of the plurality of joining boundaries 51b in the circumferential direction of the rotor 20. Also according to this modification example, the same effects as those of the modification example 1-1 are obtained.

As described above, the rotating electric machine according to this embodiment includes the stator 10, and the rotor 20 provided on the inner peripheral side of the stator 10 so as to be rotatable with respect to the stator 10. The rotor 20 includes the rotor core 21, the plurality of permanent magnets 22 provided to the rotor core 21, and the shaft 23 that is fixed to the center portion of the rotor core 21 and extends in the axial direction of the rotor 20. The plurality of holes 30 arranged in the circumferential direction of the rotor 20 are formed in the rotor core 21. The plurality of holes 30 include the plurality of first holes 31 and the plurality of second holes 32. The plurality of permanent magnets 22 are inserted only into the plurality of first holes 31 of the plurality of holes 30, respectively. The plurality of first holes 31 and the plurality of second holes 32 are alternately arranged one by one in the circumferential direction. The rotor core 21 includes the plurality of core portions 40 arranged in the circumferential direction with each of the plurality of second holes 32 defined therebetween. The plurality of permanent magnets 22 are magnetized such that magnetic-pole surfaces facing each other in the circumferential direction have different poles. Each of the plurality of core portions 40 includes the first core portion 41 located on one magnetic-pole surface side of each of the plurality of the permanent magnets 22, and the second core portion 42 located on the other magnetic-pole surface side of each of the plurality of the permanent magnets 22. The rotor core 21 includes a first rotor core in at least a part in the axial direction. The first rotor core includes the annular portion 50 and the plurality of coupling portions 51. The annular portion 50 is provided on the inner peripheral side with respect to the plurality of core portions 40, and the shaft 23 is inserted into the annular portion 50. Each of the plurality of coupling portions 51 couples the annular portion 50 and the first core portion 41 of each of the plurality of core portions 40 to each other. Each of the plurality of coupling portions 51 includes at least one coupling path 51a. The sum t1 of the width of the portion having the smallest width in at least one coupling path 51a is smaller than the length t2 of the joining boundary 51b having an arc shape between the annular portion 50 and each of the plurality of coupling portions 51. Here, the rotor core 21 which is illustrated in cross section in FIG. 8 is an example of a first rotor core. The annular portion 50 is an example of a first annular portion. The plurality of coupling portions 51 are an example of a plurality of first coupling portions.

With this configuration, the plurality of first core portions 41 magnetized to have the same pole are coupled to each other through the annular portion 50 and the plurality of coupling portions 51, thereby being capable of reducing the circumferential leakage magnetic fluxes Φ2 passing through the annular portion 50 and the plurality of coupling portions 51. Thus, the torque output of the rotating electric machine can be improved.

Further, with this configuration, the length of the joining boundary 51*b* between the annular portion 50 and the coupling portion 51 can be increased, thereby being capable of relaxing stress concentration in the joining boundary 51*b*. Thus, the strength of the rotor 20 can be improved.

Further, with this configuration, in a portion of the coupling portion 51 away from the joining boundary 51*b*, the circumferential width of the coupling portion 51 can be reduced, thereby being capable of increasing the magnetic resistance of the coupling portion 51. Thus, the circumferential leakage magnetic flux Φ2 can be reduced, thereby being capable of further improving the torque output of the rotating electric machine.

In the rotating electric machine according to this embodiment, the annular portion 50 has the protrusion 52 that is formed on the inner peripheral surface of the annular portion 50 and is in contact with the outer peripheral surface of the shaft 23. With this configuration, stress received from the shaft 23 can be concentrated on the protrusions 52, and the radial thickness of the annular portion 50 can be reduced. Thus, the circumferential leakage magnetic flux Φ2 can be further reduced, thereby being capable of further improving the torque of the rotating electric. Further, with this configuration, fastening margin tolerance required for press-fitting the shaft 23 into the annular portion 50 can be relaxed.

In the rotating electric machine according to this embodiment, the protrusion 52 is arranged at the position shifted from each of the plurality of coupling portions 51 in the circumferential direction. With this configuration, the joining boundary 51*b* between the annular portion 50 and the coupling portion 51 is less liable to receive stress from the shaft 23, and the stress generated in the joining boundary 51*b* can be made less than the yield point, thereby being capable of improving the strength of the rotor 20.

In the rotating electric machine according to this embodiment, in the cross section perpendicular to the axial direction, the annular portion 50 includes the plurality of protrusion groups 53 each including at least one protrusion 52 that is formed on the inner peripheral surface of the annular portion 50 and is in contact with the outer peripheral surface of the shaft 23. Each of the plurality of protrusion groups 53 is provided between two coupling portions 51 adjacent to each other among the plurality of coupling portions 51 in the circumferential direction. With this configuration, the joining boundary 51*b* between the annular portion 50 and the coupling portion 51 is less liable to receive stress from the shaft 23, and the stress generated in the joining boundary 51*b* can be made less than the yield point. Thus, the strength of the rotor 20 can be improved.

In the rotating electric machine according to this embodiment, the shaft 23 has the protrusion 24 that is formed on the outer peripheral surface of the shaft 23 and is in contact with the inner peripheral surface of the annular portion 50. With this configuration, fastening margin tolerance required for press-fitting the shaft 23 into the annular portion 50 can be relaxed.

In the rotating electric machine according to this embodiment, the circumferential width of the second hole 32 increases from the outer peripheral side toward the inner peripheral side. With this configuration, the circumferential leakage magnetic flux Φ2 on the inner peripheral side of the rotor 20 can be reduced, thereby being capable of suppressing a reduction in torque of the rotating electric machine.

Second Embodiment

Figure 15:
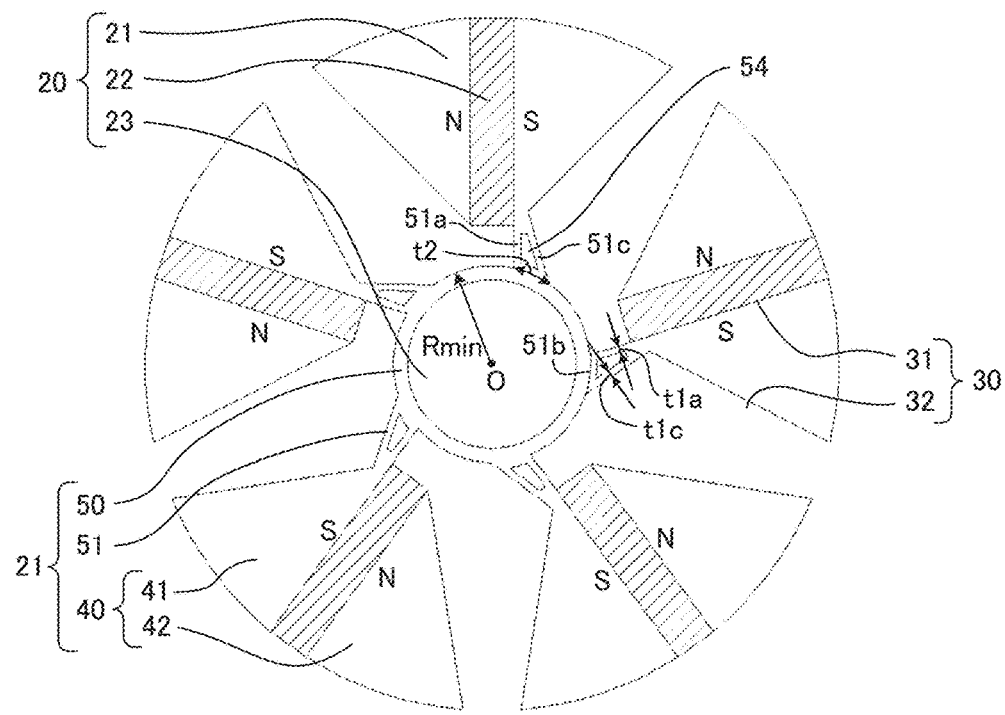
FIG. 15 is a sectional view for illustrating a configuration of a rotor for a rotating electric machine according to a second embodiment, which is taken perpendicularly to the axial direction.

A rotating electric machine according to a second embodiment is described. FIG. 15 is a sectional view for illustrating a configuration of a rotor for a rotating electric machine according to this embodiment, which is taken perpendicularly to the axial direction. Although not illustrated, the stator 10 is provided on the outer peripheral side of the rotor 20 with the gap 15 defined therebetween. The components having the same function and effect as those of the first embodiment are denoted by the same reference symbols, and description thereof is omitted.

As illustrated in FIG. 15, each of the plurality of coupling portions 51 includes the plurality of coupling paths 51*a* and 51*c* arranged in parallel to each other. The plurality of coupling paths 51*a* and 51*c* form a plurality of paths of a magnetic path formed in one coupling portion 51, respectively. In a cross section perpendicular to the axial direction, a non-magnetic hole 54 is formed in each of the plurality of coupling portions 51. The non-magnetic hole 54 is formed between two coupling paths 51*a* and 51*c* adjacent to each other. The cross-sectional shape of the non-magnetic hole 54 may be any shape. The inside of the non-magnetic hole 54 may be a space, or may be filled with a non-magnetic material.

The width t1*a* of the coupling path 51*a* is constant in the radial direction. That is, the width of the portion having the smallest width in the coupling path 51*a* is t1*a*. Similarly, a width t1*c* of the coupling path 51*c* is constant in the radial direction. That is, the width of the portion having the smallest width in the coupling path 51*c* is t1*c*. The sum t1 of the widths of the portions having the smallest width in the plurality of coupling paths 51*a* and 51*c* is a sum of the width t1*a* and the width t1*c* (t1=t1*a*+t1*c*). The sum t1 of the widths of the portions having the smallest width in the plurality of coupling paths 51*a* and 51*c* is smaller than the length t2 of the joining boundary 51*b* (t1<t2).

Figure 16:
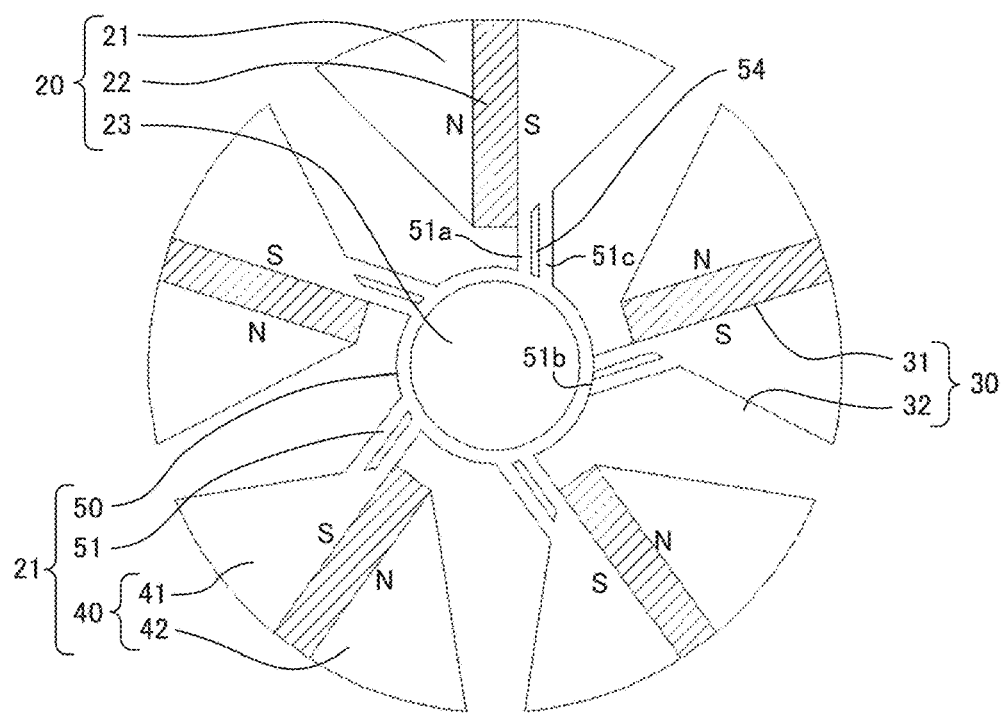
FIG. 16 is a sectional view for illustrating a configuration of a rotor for a rotating electric machine according to a modification example 2-1 of the second embodiment, which is taken perpendicularly to the axial direction.

FIG. 16 is a sectional view for illustrating a configuration of a rotor for a rotating electric machine according to a modification example 2-1 of this embodiment, which is taken perpendicularly to the axial direction. As illustrated in FIG. 16, two coupling paths 51*a* and 51*c* of the coupling portion 51 extend in parallel to each other. The non-magnetic hole 54 extends in a linear shape along the extending direction of the coupling portion 51. Also in this modification example, the sum t1 of the widths of the portions having the smallest width in the plurality of coupling paths 51*a* and 51*c* is smaller than the length t2 of the joining boundary 51*b*.

As already described, according to the above-mentioned first embodiment, it is possible to improve both the torque of the rotating electric machine and the strength of the rotor 20. However, when it is assumed that the rotating electric machine is used in a higher-speed rotation range, large stress is generated in the joining boundary 51*b*, and hence it is required to further increase the circumferential width of the coupling portion 51. However, when the circumferential width of the coupling portion 51 is increased, the circumferential leakage magnetic flux Φ2 is increased. In view of this, the inventors of the present application conceived that forming the non-magnetic hole 54 in the coupling portion 51 allows the circumferential width of the coupling portion 51 to be increased while suppressing an increase in the circumferential leakage magnetic flux Φ2.

Figure 17:
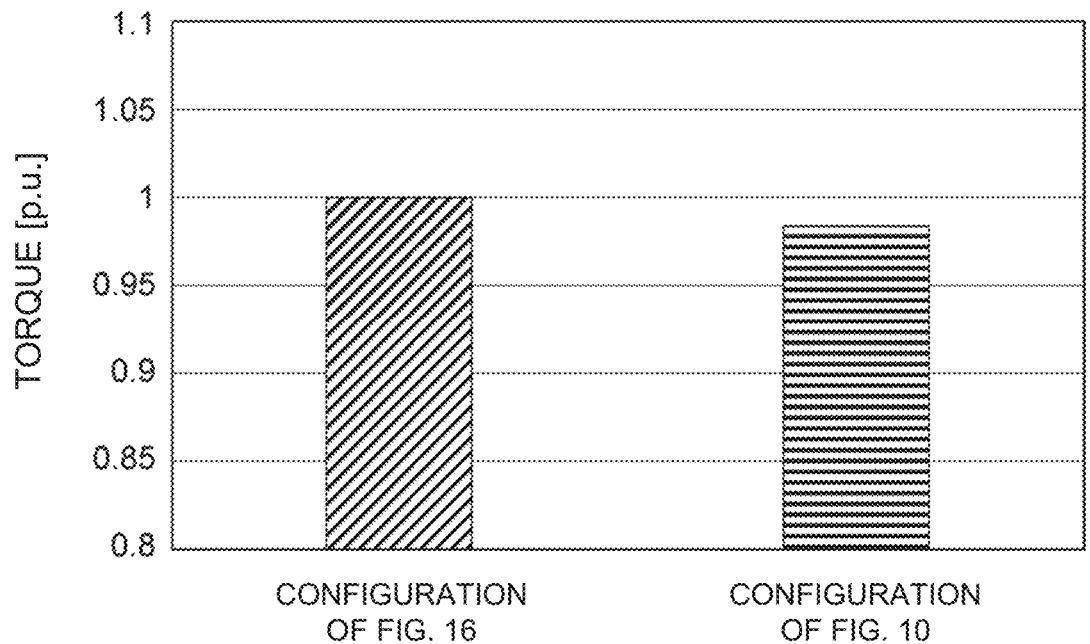
FIG. 17 is a graph for showing torque obtained in the rotating electric machine including the rotor having the configuration illustrated in FIG. 16 and torque obtained in the rotating electric machine including the rotor having the configuration illustrated in FIG. 10.

FIG. 17 is a graph for showing torque obtained in the rotating electric machine including the rotor having the configuration illustrated in FIG. 16 and torque obtained in the rotating electric machine including the rotor having the configuration illustrated in FIG. 10. The vertical axis in the graph represents torque [p.u.] normalized with the torque obtained in the rotating electric machine including the rotor 20 having the configuration illustrated in FIG. 16 as 1. Here, the rotor 20 illustrated in FIG. 16 has the same configuration as the rotor 20 illustrated in FIG. 10 except that the non-magnetic hole 54 is formed in the coupling portion 51.

As shown in FIG. 17, when the torque obtained in the rotating electric machine including the rotor 20 having the configuration illustrated in FIG. 16 is 1, the torque obtained in the rotating electric machine including the rotor 20 having the configuration illustrated in FIG. 10 is about 0.98. Thus, it is understood that, in the rotating electric machine of the modification example 2-1 including the rotor 20 having the configuration illustrated in FIG. 16, higher average torque is obtained as compared to the rotating electric machine of the third comparative example including the rotor 20 having the configuration illustrated in FIG. 10.

Figure 18:
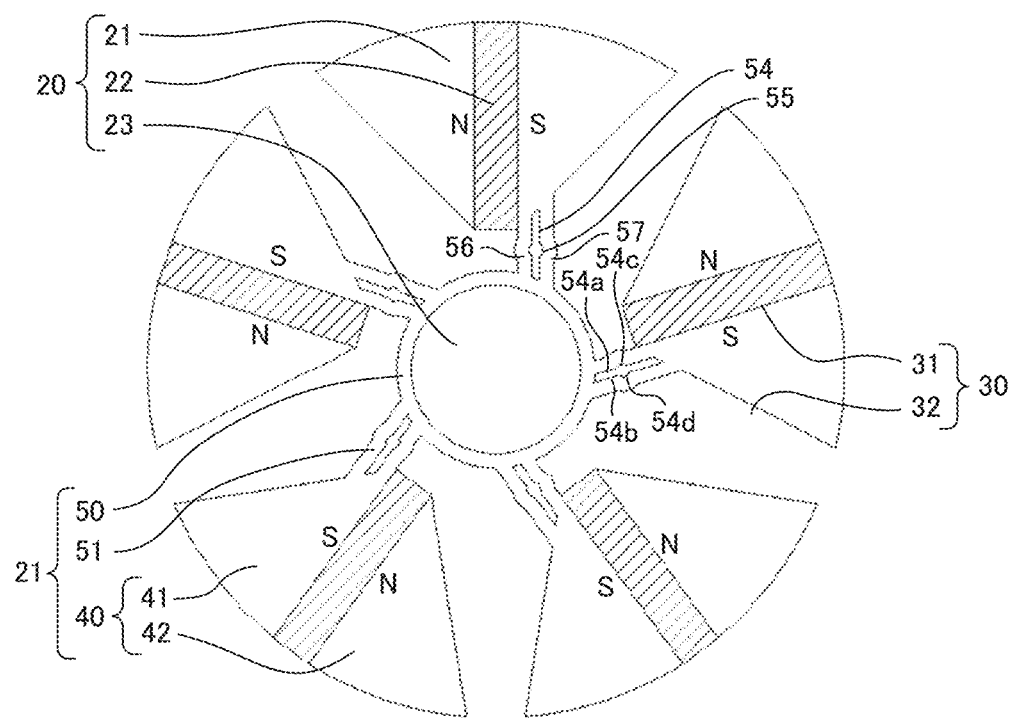
FIG. 18 is a sectional view for illustrating a configuration of a rotor for a rotating electric machine according to a modification example 2-2 of the second embodiment, which is taken perpendicularly to the axial direction.

FIG. 18 is a sectional view for illustrating a configuration of a rotor for a rotating electric machine according to a modification example 2-2 of this embodiment, which is taken perpendicularly to the axial direction. As illustrated in FIG. 18, the rotor 20 in this modification example is different from the configuration illustrated in FIG. 16 in that, in a cross section perpendicular to the axial direction, the non-magnetic hole 54 has a circular fastening hole 55 in a part thereof. The fastening hole 55 is formed such that a fastening member such as a bolt passes therethrough in the axial direction. The non-magnetic hole 54 extends along the extending direction of the coupling portion 51.

In a cross section perpendicular to the axial direction, the coupling portion 51 includes a pair of edge portions 54a and 54b facing each other across the non-magnetic hole 54. Each of the edge portion 54a and the edge portion 54b is formed in a linear shape along the extending direction of the non-magnetic hole 54. In a cross section perpendicular to the axial direction, a recessed portion 54c recessed in an arc shape is formed in a part of the edge portion 54a. In the same cross section, in a part of the edge portion 54b, a recessed portion 54d which is concentric with the recessed portion 54c and is recessed in an arc shape having the same radius as the recessed portion 54c is formed. Each of the recessed portion 54c and the recessed portion 54d forms a part of the edge portion of the circular fastening hole 55.

In a cross section perpendicular to the axial direction, the coupling portion 51 includes a first sub-coupling portion 56 arranged on the edge portion 54a side of the non-magnetic hole 54, and a second sub-coupling portion 57 arranged on the edge portion 54b side of the non-magnetic hole 54. The first sub-coupling portion 56 corresponds to the coupling path 51a of the configuration illustrated in FIG. 16. The second sub-coupling portion 57 corresponds to the coupling path 51c of the configuration illustrated in FIG. 16. Each of the first sub-coupling portion 56 and the second sub-coupling portion 57 extends from the annular portion 50 to the first core portion 41 along the extending direction of the non-magnetic hole 54, that is, the extending direction of the coupling portion 51. A part of the first sub-coupling portion 56 is curved to the outer side along the recessed portion 54c. A part of the second sub-coupling portion 57 is curved to the outer side along the recessed portion 54d. That is, a part of the first sub-coupling portion 56 and a part of the second sub-coupling portion 57 are both curved to both sides across the fastening hole 55 while bypassing the fastening hole 55. With this, the circumferential width of each of the first sub-coupling portion 56 and the second sub-coupling portion 57 is constant in the radial direction of the rotor 20. Thus, the magnetic resistance in the magnetic path of the circumferential leakage magnetic flux $\Phi 2$ is almost the same as that in the configuration illustrated FIG. 16. Also according to this modification example, the same effects as those of the configurations illustrated in FIG. 15 and FIG. 16 are obtained.

Figure 19:
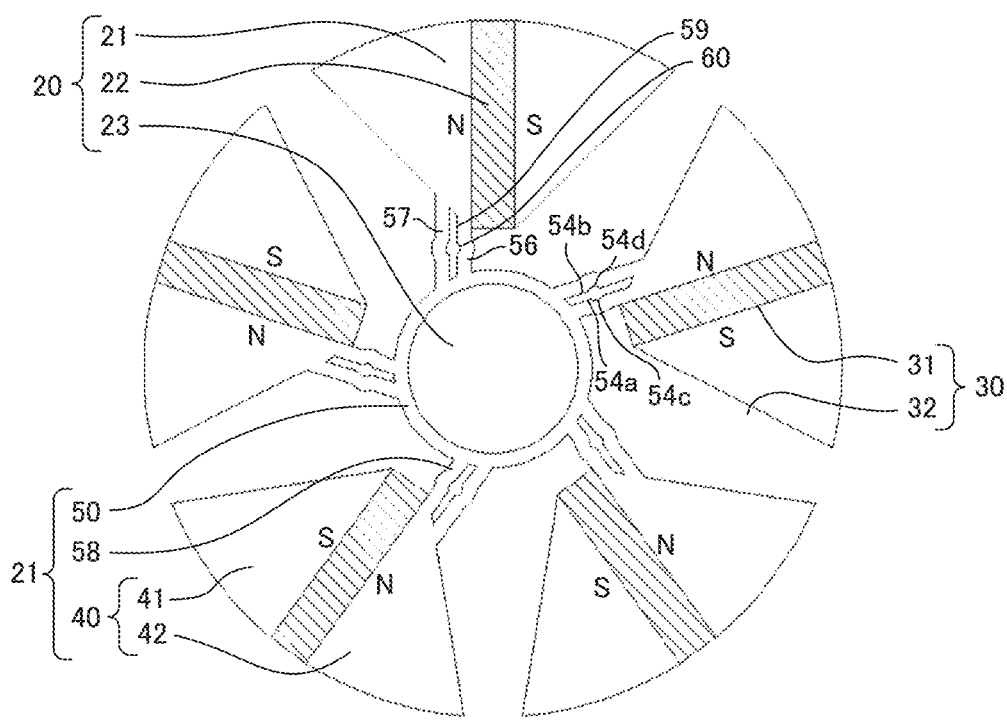
FIG. 19 is a sectional view for illustrating a configuration of a rotor for a rotating electric machine according to a modification example 2-3 of the second embodiment, which is taken perpendicularly to the axial direction.

FIG. 19 is a sectional view for illustrating a configuration of a rotor for a rotating electric machine according to a modification example 2-3 of this embodiment, which is taken perpendicularly to the axial direction. As illustrated in FIG. 19, the rotor 20 in this modification example is different from the rotor 20 in the modification example 2-2 illustrated in FIG. 18 in that a rotor core 21 includes a plurality of coupling portions 58 instead of the plurality of coupling portions 51. The plurality of coupling portions 58 couple the annular portion 50 and the plurality of second core portions 42 to each other, respectively. That is, in this modification example, in a cross section perpendicular to the axial direction, the plurality of second core portions 42 are magnetically connected to each other through the annular portion 50 and the plurality of coupling portions 58.

Meanwhile, each of the plurality of coupling portions 58 is not directly connected to the plurality of first core portions 41. In the cross section perpendicular to the axial direction, the first core portion 41 is connected to the coupling portion 58 and the annular portion 50 only through the second core portion 42 adjacent to the first core portion 41 across the permanent magnet 22.

In a cross section perpendicular to the axial direction, similarly to the coupling portion 51 in the modification example 2-2 illustrated in FIG. 18, a non-magnetic hole 59 having a circular fastening hole 60 in a part thereof is formed in the coupling portion 58. A relative position of the fastening hole 60 with respect to the rotor core 21 in this modification example is different from a relative position of the fastening hole 55 with respect to the rotor core 21 in the modification example 2-2. The fastening hole 60 in this modification example and the fastening hole 55 in the modification example 2-2 are arranged at positions symmetrical to each other across the permanent magnet 22.

Further, similarly to the coupling portion 51 in the modification example 2-2, the coupling portion 58 includes the edge portion 54a, the edge portion 54b, the recessed portion 54c, the recessed portion 54d, the first sub-coupling portion 56, and the second sub-coupling portion 57. The circumferential width of each of the first sub-coupling portion 56 and the second sub-coupling portion 57 is constant in the radial direction of the rotor 20. Also according to this modification example, the same effects as those of the configurations illustrated in FIG. 15 and FIG. 16 are obtained.

Figure 20:
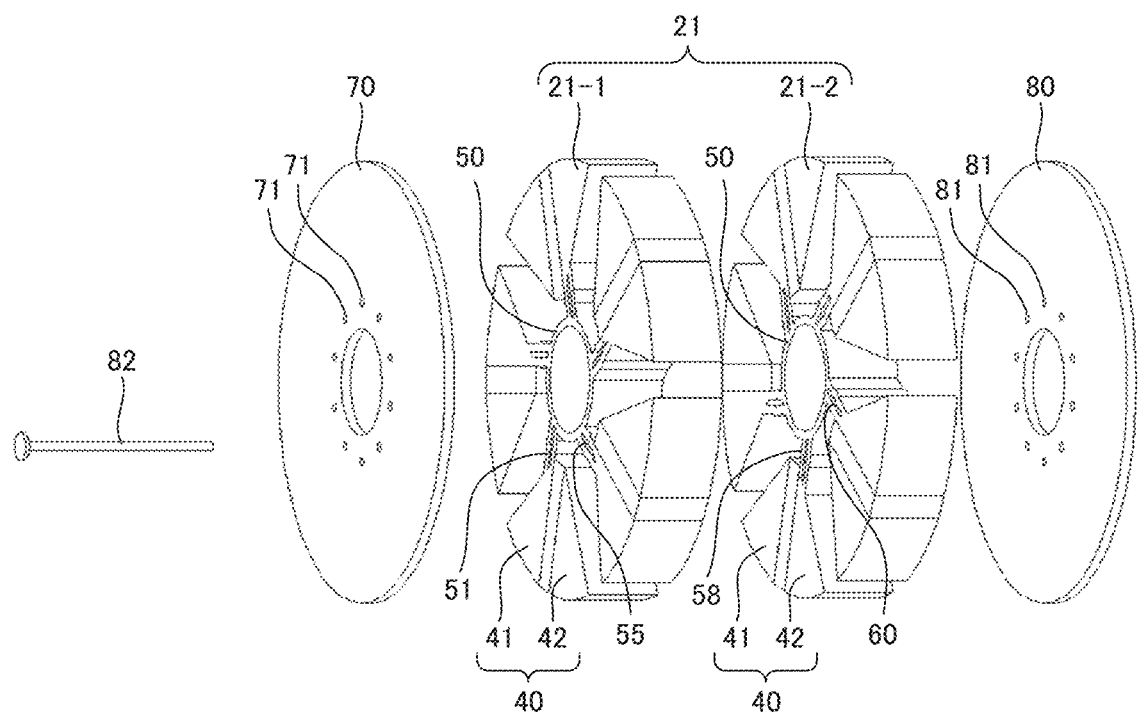
FIG. 20 is an exploded perspective view for illustrating a configuration of a rotor for a rotating electric machine according to a modification example 2-4 of the second embodiment.

FIG. 20 is an exploded perspective view for illustrating a configuration of a rotor for a rotating electric machine according to a modification example 2-4 of this embodiment. As illustrated in FIG. 20, a rotor 20 in this modification example includes a rotor core 21 in which a first rotor core 21-1 and a second rotor core 21-2 are arranged so as to overlap each other in the axial direction, and a pair of end plates 70 and 80 arranged on the outer side of the rotor core 21 in the axial direction.

The first rotor core 21-1 has a cross-sectional shape similar to the configuration illustrated in FIG. 18. The second rotor core 21-2 has a cross-sectional shape similar to the configuration illustrated in FIG. 19. The first rotor core 21-1 and the second rotor core 21-2 are laminated on each other in the axial direction of the rotor 20 such that the core portions 40 thereof overlap each other in the axial direction and the fastening holes 55 and the fastening holes 60 do not overlap each other in the axial direction. The first rotor core 21-1 and the second rotor core 21-2 are sandwiched by the pair of end plates 70 and 80 in the axial direction. One end of the coupling portion 51 of the first rotor core 21-1 in the axial direction is connected to the end plate 70. One end of the coupling portion 58 of the second rotor core 21-2 in the axial direction is connected to the end plate 80.

Each of the end plate 70 and the end plate 80 has a disk shape. In the end plate 70, a plurality of fastening holes 71 arranged in parallel in the circumferential direction are formed. The number of fastening holes 71 is equal to the sum of the number of fastening holes 55 formed in the first rotor core 21-1 and the number of fastening holes 60 formed in the second rotor core 21-2.

In the end plate 80, a plurality of fastening holes 81 arranged in parallel in the circumferential direction are formed. The number of fastening holes 81 is equal to the number of fastening holes 71. Each of the fastening hole 71 and the fastening hole 81 is formed such that a fastening member 82 such as a bolt is inserted therethrough.

The end plate 70, the first rotor core 21-1, the second rotor core 21-2, and the end plate 80 are fastened by a plurality of fastening members 82. In FIG. 20, only one fastening member 82 is illustrated.

One certain fastening member 82 is inserted into the fastening hole 71 of the end plate 70, the fastening hole 55 of the first rotor core 21-1, and the fastening hole 81 of the end plate 80 to fasten the end plate 70, the coupling portion 51 of the first rotor core 21-1, and the end plate 80. The fastening member 82 is not inserted into the fastening hole 60 of the second rotor core 21-2.

Another fastening member 82 is inserted into the fastening hole 71 of the end plate 70, the fastening hole 60 of the second rotor core 21-2, and the fastening hole 81 of the end plate 80 to fasten the end plate 70, the coupling portion 58 of the second rotor core 21-2, and the end plate 80. The fastening member 82 is not inserted into the fastening hole 55 of the first rotor core 21-1.

The end plate 70, the first rotor core 21-1, the second rotor core 21-2, and the end plate 80 are fastened by the plurality of fastening members 82 so that the rotor 20 is firmly fixed in the axial direction.

In the configuration illustrated in FIG. 20, one first rotor core 21-1 and one second rotor core 21-2 are laminated in the axial direction, but one or a plurality of first rotor cores 21-1 and one or a plurality of second rotor cores 21-2 may be alternately laminated in the axial direction.

In this modification example, in consideration of the structure in the axial direction, all the first core portions 41 and all the second core portions 42 are coupled to the coupling portions 51, the coupling portions 58, and the annular portion 50. With this, the rotor core 21 can be integrated, thereby being capable of improving the strength of the entire rotor 20.

Meanwhile, in a cross section perpendicular to the axial direction, only one of the first core portion 41 and the second core portion 42 is connected to the coupling portion 51 or the coupling portion 58. Thus, the circumferential leakage magnetic flux $\Phi 2$ is not increased significantly. Thus, according to this modification example, the strength of the rotor 20 can be improved while suppressing a reduction in torque of the rotating electric machine.

Figure 21:
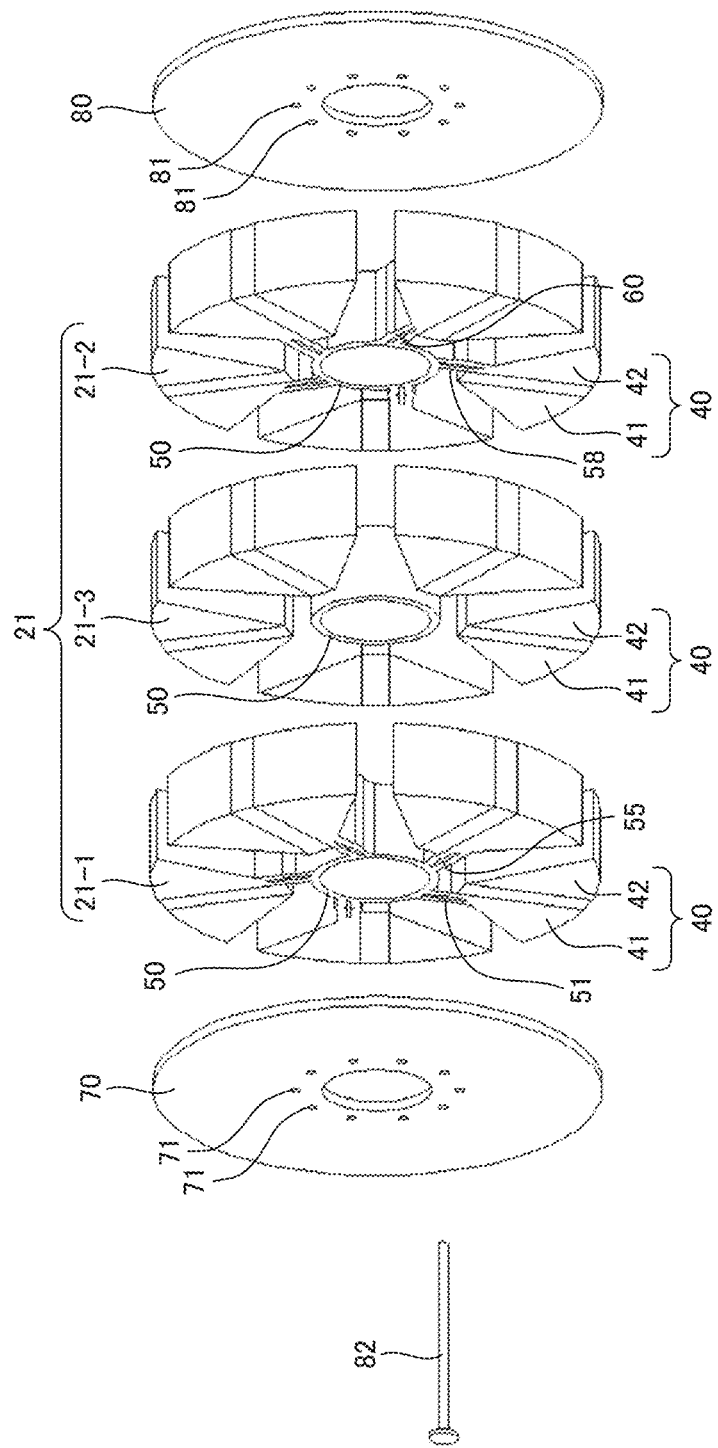
FIG. 21 is an exploded perspective view for illustrating a configuration of a rotor for a rotating electric machine according to a modification example 2-5 of the second embodiment.

FIG. 21 is an exploded perspective view for illustrating a configuration of a rotor for a rotating electric machine according to a modification example 2-5 of this embodiment. As illustrated in FIG. 21, a rotor core 21 of a rotor 20 in this modification example has a configuration in which a first rotor core 21-1, a third rotor core 21-3, and a second rotor core 21-2 are arranged so as to overlap each other in the axial direction. The end plate 70, the first rotor core 21-1, the third rotor core 21-3, the second rotor core 21-2, and the end plate 80 are laminated in this order in the axial direction.

The first rotor core 21-1 has a cross-sectional shape similar to the configuration illustrated in FIG. 18. The second rotor core 21-2 has a cross-sectional shape similar to the configuration illustrated in FIG. 19. Similarly to the first rotor core 21-1 and the second rotor core 21-2, the third rotor core 21-3 includes a plurality of core portions 40 and an annular portion 50. In the third rotor core 21-3, the coupling portions 51 and the coupling portions 58 are not formed. Thus, each of the plurality of core portions 40 of the third rotor core 21-3 is away from the annular portion 50 in a cross section perpendicular to the axial direction. The first rotor core 21-1, the third rotor core 21-3, and the second rotor core 21-2 are sandwiched by the pair of end plates 70 and 80 in the axial direction.

The end plate 70, the first rotor core 21-1, the third rotor core 21-3, the second rotor core 21-2, and the end plate 80 are fastened by a plurality of fastening members 82. In FIG. 21, only one fastening member 82 is illustrated.

One certain fastening member 82 is inserted into the fastening hole 71 of the end plate 70, the fastening hole 55 of the first rotor core 21-1, and the fastening hole 81 of the end plate 80 to fasten the end plate 70, the first rotor core 21-1, and the end plate 80. The fastening member 82 is not inserted into the fastening hole 60 of the second rotor core 21-2. In the third rotor core 21-3, a fastening hole into which the fastening member 82 is to be inserted is not formed.

Another fastening member 82 is inserted into the fastening hole 71 of the end plate 70, the fastening hole 60 of the second rotor core 21-2, and the fastening hole 81 of the end plate 80 to fasten the end plate 70, the second rotor core 21-2, and the end plate 80. The fastening member 82 is not inserted into the fastening hole 55 of the first rotor core 21-1. In the third rotor core 21-3, a fastening hole into which the fastening member 82 is to be inserted is not formed.

The end plate 70, the first rotor core 21-1, the third rotor core 21-3, the second rotor core 21-2, and the end plate 80 are fastened by the plurality of fastening members 82 to be firmly fixed in the axial direction.

In the configuration illustrated in FIG. 21, one first rotor core 21-1, one third rotor core 21-3, and one second rotor core 21-2 are laminated in the axial direction. However, one or a plurality of first rotor cores 21-1, one or a plurality of third rotor cores 21-3, and one or a plurality of second rotor cores 21-2 may be sequentially laminated in the axial direction.

It is desired that the third rotor core 21-3 be arranged between the first rotor core 21-1 and the second rotor core 21-2 adjacent to each other in the axial direction. With this, the coupling portions 51 of the first rotor core 21-1 and the coupling portions 58 of the second rotor core 21-2 are separated from each other with the third rotor core 21-3 interposed therebetween in the axial direction. Thus, leakage magnetic flux in the axial direction between the first rotor core 21-1 and the second rotor core 21-2 can be reduced.

In this modification example, in consideration of the structure in the axial direction, all the first core portions 41 and all the second core portions 42 are coupled to the coupling portions 51, the coupling portions 58, and the annular portion 50. With this, the rotor core 21 can be integrated, thereby being capable of improving the strength of the entire rotor 20.

In the first rotor core 21-1 and the second rotor core 21-2, in a cross section perpendicular to the axial direction, only one of the first core portion 41 and the second core portion 42 is connected to the coupling portion 51 or the coupling portion 58. Further, in the third rotor core 21-3, in a cross section perpendicular to the axial direction, both the first core portion 41 and the second core portion 42 are away from the annular portion 50. Thus, the circumferential leakage magnetic flux Φ2 can be reduced.

Thus, according to this modification example, the strength of the rotor 20 can be improved while suppressing a reduction in torque of the rotating electric machine.

Figure 22:
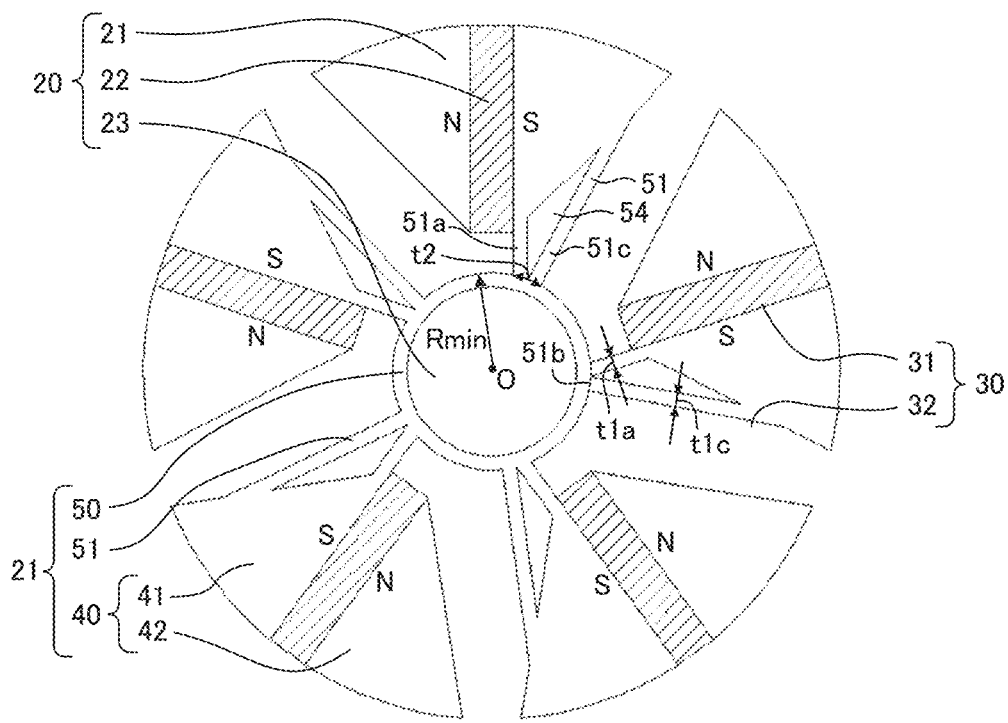
FIG. 22 is a sectional view for illustrating a configuration of a rotor for a rotating electric machine according to a modification example 2-6 of the second embodiment, which is taken perpendicularly to the axial direction.

FIG. 22 is a sectional view for illustrating a configuration of a rotor for a rotating electric machine according to a modification example 2-6 of this embodiment, which is taken perpendicularly to the axial direction. As illustrated in FIG. 22, each of the plurality of coupling portions 51 includes a plurality of coupling paths 51$a$ and 51$c$. In a cross section perpendicular to the axial direction, a non-magnetic hole 54 is formed in each of the plurality of coupling portions 51. The non-magnetic hole 54 is formed between two coupling paths 51$a$ and 51$c$ adjacent to each other.

A width t1$a$ of the coupling path 51$a$ is constant in the radial direction. That is, the width of the portion having the smallest width in the coupling path 51$a$ is t1$a$. Similarly, a width t1$c$ of the coupling path 51$c$ is constant in the radial direction. That is, the width of the portion having the smallest width in the coupling path 51$c$ is t1$c$. The sum t1 of the widths of the portions having the smallest width in the plurality of coupling paths 51$a$ and 51$c$ is a sum of the width t1$a$ and the width t1$c$ (t1=t1$a$+t1$c$). The sum t1 of the widths of the portions having the smallest width in the plurality of coupling paths 51$a$ and 51$c$ is smaller than the length t2 of the joining boundary 51$b$ (t1<t2).

Figure 23:
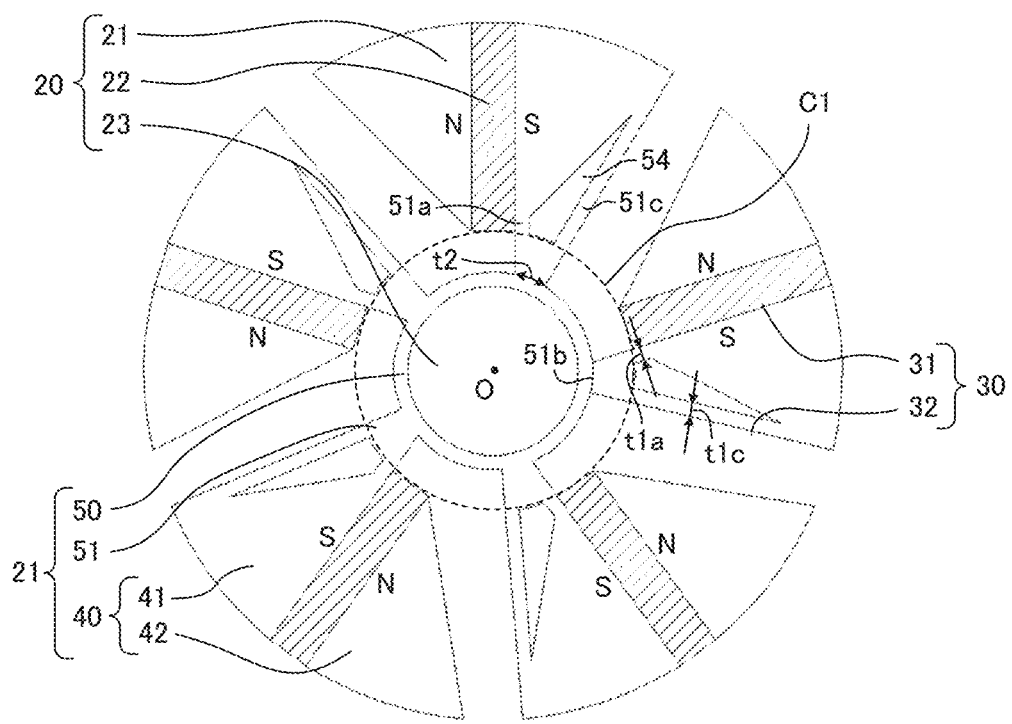
FIG. 23 is a sectional view for illustrating a configuration of a rotor for a rotating electric machine according to a modification example 2-7 of the second embodiment, which is taken perpendicularly to the axial direction.

FIG. 23 is a sectional view for illustrating a configuration of a rotor for a rotating electric machine according to a modification example 2-7 of this embodiment, which is taken perpendicularly to the axial direction. As illustrated in FIG. 23, each of the plurality of coupling portions 51 includes a plurality of coupling paths 51$a$ and 51$c$. In a cross section perpendicular to the axial direction, a non-magnetic hole 54 is formed in each of the plurality of coupling portions 51. The non-magnetic hole 54 is formed between two coupling paths 51$a$ and 51$c$ adjacent to each other.

A width of the portion having the smallest width in the coupling path 51$a$ is t1$a$. A width of the portion having the smallest width in the coupling path 51$c$ is t1$c$. The sum t1 of the widths of the portions having the smallest width in the plurality of coupling paths 51$a$ and 51$c$ is a sum of the width t1$a$ and the width t1$c$ (t1=t1$a$+t1$c$). Also in this modification example, the sum t1 of the widths of the portions having the smallest width in the plurality of coupling paths 51$a$ and 51$c$ is smaller than the length t2 of the joining boundary 51$b$ (t1<t2).

Here, in a cross section perpendicular to the axial direction, an inscribed circle inscribed in the plurality of permanent magnets 22 about the axial center O of the rotor 20 is a circle C1. In this case, the non-magnetic holes 54 in this modification example are arranged on the outer peripheral side with respect to the circle C1. For example, the non-magnetic holes 54 are not present on the inner peripheral side with respect to the circle C1, and are present only on the outer peripheral side with respect to the circle C1.

In this modification example, the circumferential width of the joining boundary 51$b$ between the coupling portion 51 and the annular portion 50 can be increased, thereby being capable of relaxing stress concentration in the joining boundary 51$b$. Further, on the inner peripheral side with respect to the inner peripheral end of the permanent magnet 22, the strength of the coupling portion 51 can be improved.

Figure 24:
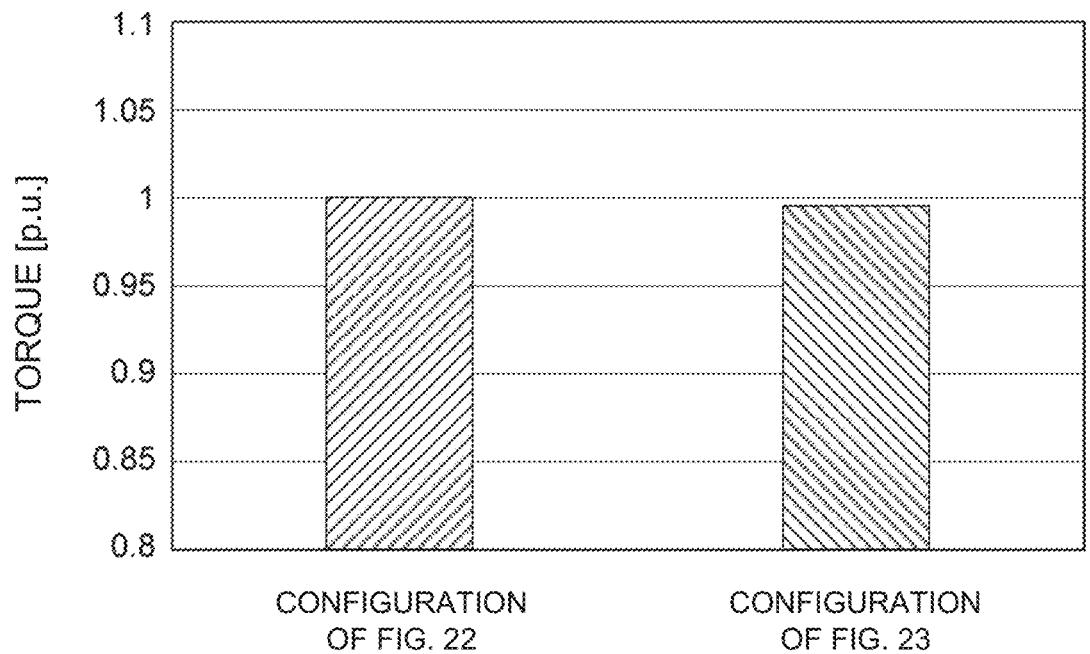
FIG. 24 is a graph for showing torque obtained in the rotating electric machine including the rotor having the configuration illustrated in FIG. 22 and torque obtained in the rotating electric machine including the rotor having the configuration illustrated in FIG. 23.

FIG. 24 is a graph for showing torque obtained in the rotating electric machine including the rotor having the configuration illustrated in FIG. 22 and torque obtained in the rotating electric machine including the rotor having the configuration illustrated in FIG. 23. The vertical axis in the graph represents torque [p.u.] normalized with the torque obtained in the rotating electric machine including the rotor having the configuration illustrated in FIG. 22 as 1.

As shown in FIG. 24, when the torque obtained in the rotating electric machine including the rotor having the configuration illustrated in FIG. 22 is 1, the torque obtained in the rotating electric machine including the rotor having the configuration illustrated in FIG. 23 is about 0.995. Thus, it is understood that, according to the rotating electric machine of this modification example illustrated in FIG. 23, average torque equivalent to that of the rotating electric machine of the modification example 2-6 illustrated in FIG. 22 is obtained. That is, according to this modification example, the strength of the rotor 20 can be improved while suppressing a reduction in torque of the rotating electric machine.

As described above, the rotating electric machine according to this embodiment includes the stator 10, and the rotor 20 provided on the inner peripheral side of the stator 10 so as to be rotatable with respect to the stator 10. The rotor 20 includes the rotor core 21, the plurality of permanent magnets 22 provided to the rotor core 21, and the shaft 23 that is fixed to the center portion of the rotor core 21 and extends in the axial direction of the rotor 20. The plurality of holes 30 arranged in the circumferential direction of the rotor 20 are formed in the rotor core 21. The plurality of holes 30 include the plurality of first holes 31 and the plurality of second holes 32. The plurality of permanent magnets 22 are inserted only into the plurality of first holes 31 of the plurality of holes 30, respectively. The plurality of first holes 31 and the plurality of second holes 32 are alternately arranged one by one in the circumferential direction. The rotor core 21 includes the plurality of core portions 40 arranged in the circumferential direction with each of the plurality of second holes 32 defined therebetween. The plurality of permanent magnets 22 are magnetized such that magnetic-pole surfaces facing each other in the circumferential direction have different poles. Each of the plurality of core portions 40 includes the first core portion 41 located on one magnetic-pole surface side of each of the plurality of the permanent magnets 22, and the second core portion 42 located on the other magnetic-pole surface side of each of the plurality of the permanent magnets 22. The rotor core 21 includes a first rotor core in at least a part in the axial direction. The first rotor core includes the annular portion 50 and the plurality of coupling portions 51. The annular portion 50 is provided on the inner peripheral side with respect to the plurality of core portions 40, and the shaft 23 is inserted into the annular portion 50. Each of the plurality of coupling portions 51 couples the annular portion 50 and the first core portion 41 of each of the plurality of core portions 40 to each other. Each of the plurality of coupling portions 51 includes the plurality of coupling paths 51$a$ and 51$c$. The sum t1 of the widths of the portions having the smallest width in each of the plurality of coupling paths 51$a$ and 51c is smaller than the length t2 of the joining boundary 51b having an arc shape between the annular portion 50 and each of the plurality of coupling portions 51. The non-magnetic hole 54 is formed between two coupling paths 51a and 51c adjacent to each other among the plurality of coupling paths 51a and 51c. Here, the annular portion 50 is an example of a first annular portion. The plurality of coupling portions 51 are an example of a plurality of first coupling portions.

With this configuration, the plurality of first core portions 41 magnetized to have the same pole are coupled to each other through the annular portion 50 and the plurality of coupling portions 51, thereby being capable of reducing the circumferential leakage magnetic fluxes Φ2 passing through the annular portion 50 and the plurality of coupling portions 51. Thus, with this configuration, the torque output of the rotating electric machine can be improved.

Further, with this configuration, the non-magnetic hole 54 is formed in the coupling portion 51. Thus, the circumferential width of the coupling portion 51 can be increased while suppressing an increase in the circumferential leakage magnetic flux Φ2 passing through the coupling portion 51. Thus, with this configuration, the effective magnetic flux Φ1 can be increased, thereby being capable of further improving the torque output of the rotating electric machine. Further, with this configuration, stress concentration in the coupling portion 51 can be relaxed, thereby being capable of improving the strength of the rotor 20.

In the rotating electric machine according to this embodiment, in a cross section perpendicular to the axial direction, the non-magnetic hole 54 has the circular fastening hole 55 that allows the fastening member 82 to pass therethrough in the axial direction. With this configuration, the rotor 20 can be fastened in the axial direction with the fastening member 82, thereby being capable of improving the strength of the rotor 20.

In the rotating electric machine according to this embodiment, in a cross section perpendicular to the axial direction, the non-magnetic holes 54 are arranged on the outer peripheral side with respect to the circle C1 inscribed in the plurality of permanent magnets 22 about the axial center O of the rotor 20. With this configuration, the circumferential width of the joining boundary 51b between the coupling portion 51 and the annular portion 50 can be increased. Thus, stress concentration in the joining boundary 51b can be relaxed, and the strength of the rotor 20 can be improved. Further, with this configuration, the strength of the coupling portion 51 can be improved on the inner peripheral side with respect to the inner peripheral end of the permanent magnet 22.

In the rotating electric machine according to this embodiment, the circumferential width of each of the plurality of coupling portions 51 is constant in the radial direction of the rotor 20. With this configuration, the circumferential width of the coupling portion 51 can be increased while suppressing an increase in the circumferential leakage magnetic flux Φ2. Thus, the strength of the rotor 20 can be improved while improving the torque of the rotating electric machine.

In the rotating electric machine according to this embodiment, the rotor 20 further includes the end plate 70 and the end plate 80 arranged on the outer side of the rotor core 21 in the axial direction. The end portion of each of the plurality of coupling portions 51 in the axial direction is connected to the end plate 70 or the end plate 80. With this configuration, each of the plurality of coupling portions 51 is supported by the end plate 70 or the end plate 80, thereby being capable of improving the strength of the rotor 20.

In the rotating electric machine according to this embodiment, each of the plurality of coupling portions 51 and the end plate 70 or the end plate 80 are fastened by the fastening member 82 passing through the non-magnetic hole 54. With this configuration, the rotor 20 can be fastened in the axial direction by the fastening member 82, thereby being capable of improving the strength of the rotor 20.

In the rotating electric machine according to this embodiment, the rotor core 21 further includes the second rotor core 21-2 arranged so as to overlap the first rotor core 21-1 in the axial direction. The second rotor core 21-2 includes the annular portion 50 which is provided on the inner peripheral side with respect to the plurality of core portions 40 and has the shaft 23 inserted thereinto, and the plurality of coupling portions 58 that couple the annular portion 50 and the second core portions 42 of the plurality of core portions 40 to each other, respectively. Here, the annular portion 50 of the second rotor core 21-2 is an example of a second annular portion. The plurality of coupling portions 58 of the second rotor core 21-2 are an example of a plurality of second coupling portions.

With this configuration, in consideration of the structure in the axial direction, both of the first core portions 41 and the second core portions 42 are coupled to the coupling portions 51, the coupling portions 58, and the annular portion 50. With this, the rotor core 21 can be integrated, thereby being capable of improving the strength of the entire rotor 20.

In the rotating electric machine according to this embodiment, the rotor core 21 further includes the third rotor core 21-3 arranged so as to overlap the first rotor core 21-1 and the second rotor core 21-2 in the axial direction. The third rotor core 21-3 includes the annular portion 50 which is provided on the inner peripheral side with respect to the plurality of core portions 40 and has the shaft 23 inserted thereinto. In the cross section perpendicular to the axial direction, the annular portion 50 of the third rotor core 21-3 is away from any of the first core portion 41 and the second core portion 42 of the plurality of core portions 40. Here, the annular portion 50 of the third rotor core 21-3 is an example of a third annular portion.

With this configuration, in the third rotor core 21-3 being a part of the rotor core 21 in the axial direction, the annular portion 50 is away from any of the first core portions 41 and the second core portions 42. Thus, the circumferential leakage magnetic flux Φ2 of the rotor core 21 can be further reduced.

Third Embodiment

Figure 25:
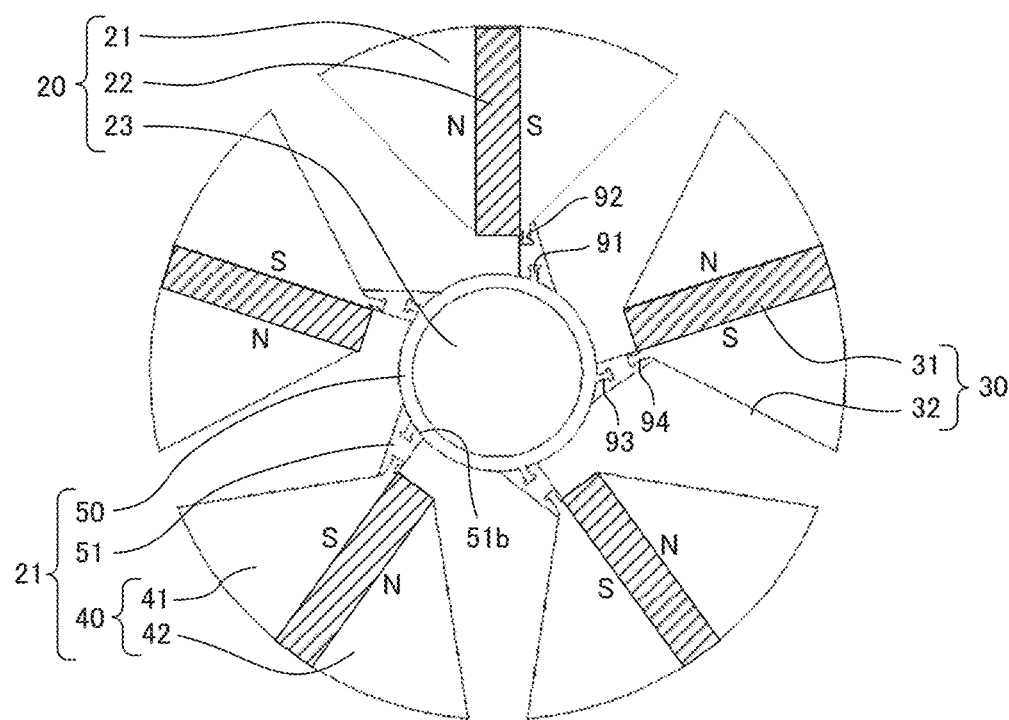
FIG. 25 is a sectional view for illustrating a configuration of a rotor for a rotating electric machine according to a third embodiment, which is taken perpendicularly to the axial direction.

A rotating electric machine according to a third embodiment is described. FIG. 25 is a sectional view for illustrating a configuration of a rotor for a rotating electric machine according to this embodiment, which is taken perpendicularly to the axial direction. Although not illustrated, the stator 10 is provided on the outer peripheral side of the rotor 20 with the gap 15 defined therebetween. The components having the same function and effect as those of the first or second embodiment are denoted by the same reference symbols, and description thereof is omitted.

As illustrated in FIG. 25, the plurality of coupling portions 51 couple the annular portion 50 and the plurality of first core portions 41 to each other, respectively. Each of the plurality of coupling portions 51 is formed separately from both of the annular portion 50 and the first core portion 41.

Each of the plurality of coupling portions 51 has a configuration of being separable from both of the annular portion 50 and the first core portion 41.

Each of the plurality of coupling portions 51 is made of a non-magnetic material. Thus, the circumferential leakage magnetic flux Φ2 passing through the coupling portion 51 can be reduced. However, each of the plurality of coupling portions 51 may be made of a magnetic material. Similarly to the configuration illustrated in FIG. 8, the sum of the width of the portion having the smallest width in at least one coupling path of the coupling portion 51 is smaller than the length of the joining boundary 51b.

Each of the plurality of coupling portions 51 has a joining recessed portion 91 to be joined to the annular portion 50 at one end portion in the radial direction. Further, each of the plurality of coupling portions 51 has a joining recessed portion 92 to be joined to the first core portion 41 at the other end portion in the radial direction. Each of the joining recessed portion 91 and the joining recessed portion 92 has, for example, a T shape in cross section. Each of the joining recessed portion 91 and the joining recessed portion 92 has a uniform cross-sectional shape along the axial direction of the rotor 20.

The annular portion 50 has a plurality of joining protrusions 93 on the outer peripheral surface side. The plurality of joining protrusions 93 are fitted to the joining recessed portions 91 of the plurality of coupling portions 51 from the axial direction, respectively. Each of the plurality of joining protrusions 93 has a T shape in cross section to be fitted to the joining recessed portion 91. Each of the plurality of joining protrusions 93 has a uniform cross-sectional shape along the axial direction of the rotor 20.

Each of the plurality of first core portions 41 has a joining protrusion 94 on the inner peripheral surface side. The joining protrusion 94 is fitted to the joining recessed portion 92 of each of the plurality of coupling portions 51 from the axial direction. The joining protrusion 94 has a T shape in cross section to be fitted to the joining recessed portion 92. The joining protrusion 94 has a uniform cross-sectional shape along the axial direction of the rotor 20.

Each of the plurality of coupling portions 51 can be separated from the annular portion 50 by being relatively shifted from the annular portion 50 in the axial direction. Meanwhile, for the force acting in a plane perpendicular to the axial direction, each of the plurality of coupling portions 51 is firmly fixed to the annular portion 50.

Further, each of the plurality of coupling portions 51 can be separated from each of the plurality of first core portions 41 by being relatively shifted from each of the plurality of first core portions 41 in the axial direction. Meanwhile, for the force acting in a plane perpendicular to the axial direction, each of the plurality of coupling portions 51 is firmly fixed to each of the plurality of first core portions 41.

The coupling portion 51 can be separated from both of the annular portion 50 and the first core portion 41. Thus, components of the rotor core 21 can be simplified in shape, and ease of manufacture of the rotor 20 can be improved.

Figure 26:
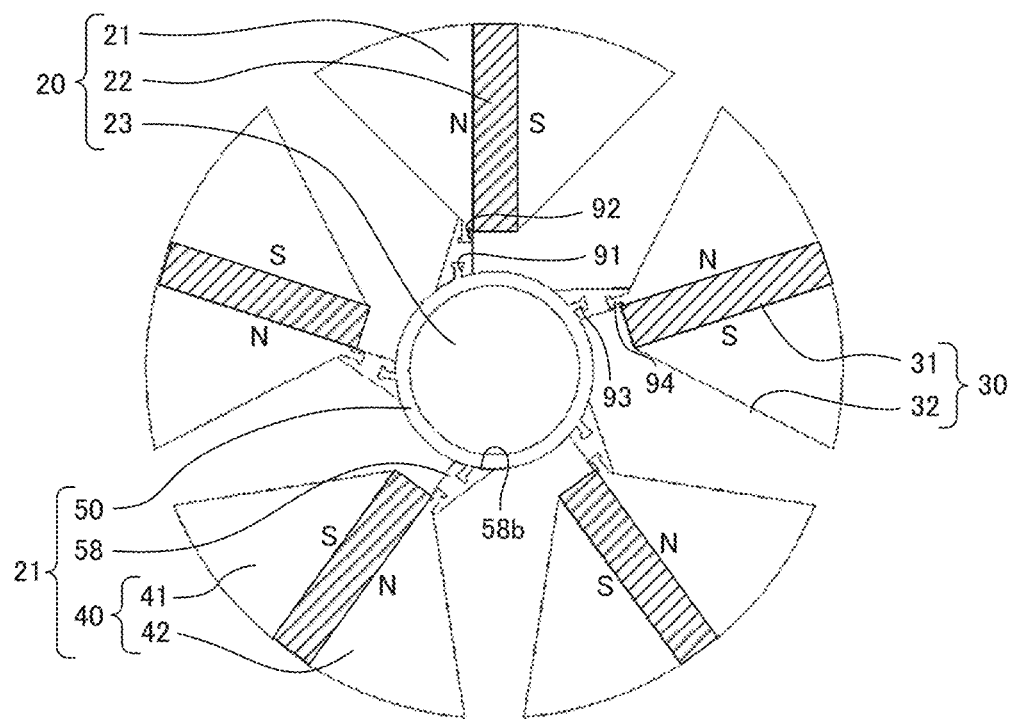
FIG. 26 is a sectional view for illustrating a configuration of a rotor for a rotating electric machine according to a modification example 3-1 of the third embodiment, which is taken perpendicularly to the axial direction.

FIG. 26 is a sectional view for illustrating a configuration of a rotor for a rotating electric machine according to a modification example 3-1 of this embodiment, which is taken perpendicularly to the axial direction. As illustrated in FIG. 26, the rotor 20 in this modification example is different from the rotor 20 illustrated in FIG. 25 in that a rotor core 21 includes a plurality of coupling portions 58 instead of the plurality of coupling portions 51.

The plurality of coupling portions 58 couple the annular portion 50 and the plurality of second core portions 42 to each other, respectively. Each of the plurality of coupling portions 58 is formed separately from both of the annular portion 50 and the second core portion 42. Each of the plurality of coupling portions 58 has a configuration of being separable from both of the annular portion 50 and the second core portion 42.

Each of the plurality of coupling portions 58 is made of a non-magnetic material. Thus, the circumferential leakage magnetic flux Φ2 passing through the coupling portion 58 can be reduced. However, each of the plurality of coupling portions 58 may be made of a magnetic material. Similarly to the configuration illustrated in FIG. 8, the sum of the width of the portion having the smallest width in at least one coupling path of the coupling portion 58 is smaller than the length of a joining boundary 58b.

Similarly to each of the plurality of coupling portions 51, each of the plurality of coupling portions 58 has a joining recessed portion 91 at one end portion in the radial direction, and a joining recessed portion 92 at the other end portion in the radial direction. Each of the joining recessed portion 91 and the joining recessed portion 92 has, for example, a T shape in cross section. Each of the joining recessed portion 91 and the joining recessed portion 92 has a uniform cross-sectional shape along the axial direction of the rotor 20.

The annular portion 50 has a plurality of joining protrusions 93 on the outer peripheral surface side. The plurality of joining protrusions 93 are fitted to the joining recessed portions 91 of the plurality of coupling portions 58 from the axial direction, respectively. Each of the plurality of joining protrusions 93 has a T shape in cross section to be fitted to the joining recessed portion 91. Each of the plurality of joining protrusions 93 has a uniform cross-sectional shape along the axial direction of the rotor 20.

Each of the plurality of second core portions 42 has a joining protrusion 94 on the inner peripheral surface side. The joining protrusion 94 is fitted to the joining recessed portion 92 of each of the plurality of coupling portions 58 from the axial direction. The joining protrusion 94 has a T shape in cross section to be fitted to the joining recessed portion 92. The joining protrusion 94 has a uniform cross-sectional shape along the axial direction of the rotor 20.

Each of the plurality of coupling portions 58 can be separated from the annular portion 50 by being relatively shifted from the annular portion 50 in the axial direction. Meanwhile, for the force acting in a plane perpendicular to the axial direction, each of the plurality of coupling portions 58 is firmly fixed to the annular portion 50.

Further, each of the plurality of coupling portions 58 can be separated from each of the plurality of second core portions 42 by being relatively shifted from each of the plurality of second core portions 42 in the axial direction. Meanwhile, for the force acting in a plane perpendicular to the axial direction, each of the plurality of coupling portions 58 is firmly fixed to each of the plurality of second core portions 42.

Figure 27:
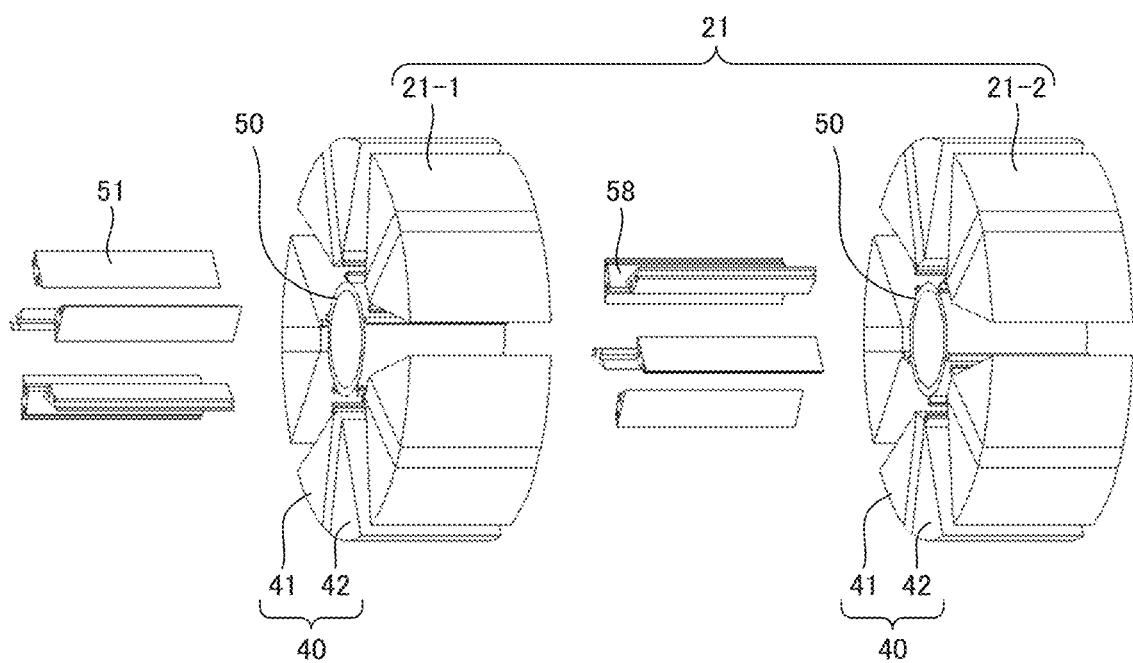
FIG. 27 is an exploded perspective view for illustrating a configuration of a rotor for a rotating electric machine according to a modification example 3-2 of the third embodiment.

FIG. 27 is an exploded perspective view for illustrating a configuration of a rotor for a rotating electric machine according to a modification example 3-2 of this embodiment. As illustrated in FIG. 27, a rotor 20 in this modification example includes a rotor core 21 in which a first rotor core 21-1 and a second rotor core 21-2 are arranged so as to overlap each other in the axial direction.

The first rotor core 21-1 has a cross-sectional shape similar to the configuration illustrated in FIG. 25. The second rotor core 21-2 has a cross-sectional shape similar to the configuration illustrated in FIG. 26. The first rotor core 21-1 and the second rotor core 21-2 are laminated on each other in the axial direction of the rotor 20 such that the core portions 40 thereof overlap each other in the axial direction.

In the configuration illustrated in FIG. 25, one first rotor core 21-1 and one second rotor core 21-2 are laminated in the axial direction. However, one or a plurality of first rotor cores 21-1 and one or a plurality of second rotor cores 21-2 may be alternately laminated in the axial direction.

In this modification example, in consideration of the structure in the axial direction, all the first core portions 41 and all the second core portions 42 are coupled to the coupling portions 51, the coupling portions 58, and the annular portion 50. With this, the rotor core 21 can be integrated, thereby being capable of improving the strength of the entire rotor 20.

Meanwhile, in a cross section perpendicular to the axial direction, only one of the first core portion 41 and the second core portion 42 is connected to the coupling portion 51 or the coupling portion 58. Thus, the circumferential leakage magnetic flux Φ2 is not increased significantly. Thus, according to this modification example, the strength of the rotor 20 can be improved while suppressing a reduction in torque of the rotating electric machine.

Further, the rotor 20 in this modification example may further include the third rotor core 21-3 as illustrated in FIG. 21 in addition to the first rotor core 21-1 and the second rotor core 21-2. In this case, it is desired that the third rotor core 21-3 be arranged between the first rotor core 21-1 and the second rotor core 21-2 adjacent to each other in the axial direction. With this, the coupling portions 51 of the first rotor core 21-1 and the coupling portions 58 of the second rotor core 21-2 are separated from each other with the third rotor core 21-3 interposed therebetween in the axial direction. Thus, leakage magnetic flux in the axial direction between the first rotor core 21-1 and the second rotor core 21-2 can be reduced.

As described above, the rotating electric machine according to this embodiment includes the stator 10, and the rotor 20 provided on the inner peripheral side of the stator 10 so as to be rotatable with respect to the stator 10. The rotor 20 includes the rotor core 21, the plurality of permanent magnets 22 provided to the rotor core 21, and the shaft 23 that is fixed to the center portion of the rotor core 21 and extends in the axial direction of the rotor 20. The plurality of holes 30 arranged in the circumferential direction of the rotor 20 are formed in the rotor core 21. The plurality of holes 30 include the plurality of first holes 31 and the plurality of second holes 32. The plurality of permanent magnets 22 are inserted only into the plurality of first holes 31 of the plurality of holes 30, respectively. The plurality of first holes 31 and the plurality of second holes 32 are alternately arranged one by one in the circumferential direction. The rotor core 21 includes the plurality of core portions 40 arranged in the circumferential direction with each of the plurality of second holes 32 defined therebetween. The plurality of permanent magnets 22 are magnetized such that magnetic-pole surfaces facing each other in the circumferential direction have different poles. Each of the plurality of core portions 40 includes the first core portion 41 located on one magnetic-pole surface side of each of the plurality of the permanent magnets 22, and the second core portion 42 located on the other magnetic-pole surface side of each of the plurality of the permanent magnets 22. The rotor core 21 includes a first rotor core in at least a part in the axial direction. The first rotor core includes the annular portion 50 and the plurality of coupling portions 51. The annular portion 50 is provided on the inner peripheral side with respect to the plurality of core portions 40, and the shaft 23 is inserted into the annular portion 50. Each of the plurality of coupling portions 51 couples the annular portion 50 and the first core portion 41 of each of the plurality of core portions 40 to each other. Each of the plurality of coupling portions 51 has a configuration of being separable from both of the annular portion 50 and the first core portion 41. Here, the annular portion 50 is an example of the first annular portion. The plurality of coupling portions 51 are an example of the plurality of first coupling portions.

With this configuration, the plurality of first core portions 41 magnetized to have the same pole are coupled to each other through the annular portion 50 and the plurality of coupling portions 51, thereby being capable of reducing the circumferential leakage magnetic fluxes Φ2 passing through the annular portion 50 and the plurality of coupling portions 51. Thus, with this configuration, the torque output of the rotating electric machine can be improved.

Further, with this configuration, each of the plurality of coupling portions 51 can be separated from both of the annular portion 50 and the first core portion 41, thereby being capable of improving ease of manufacture of the rotor 20.

In the rotating electric machine according to this embodiment, each of the plurality of coupling portions 51 is made of a non-magnetic material. With this configuration, the circumferential leakage magnetic flux Φ2 passing through the coupling portion 51 can be further reduced, thereby being capable of further improving the torque of the rotating electric machine.

The modification examples of the above-mentioned first to third embodiments can be carried out in combination. For example, similarly to the second rotor core 21-2 in the second or third embodiment, the rotor core 21 in the first embodiment may include the coupling portions 58 that each couple the annular portion 50 and the second core portion 42 to each other instead of the coupling portions 51.

The rotor core 21 in the first embodiment may include the first rotor core 21-1 including the coupling portions 51 that each couple the annular portion 50 and the first core portion 41 to each other, and the second rotor core 21-2 including the coupling portions 58 that each couple the annular portion 50 and the second core portion 42 to each other. Further, the rotor core 21 in the first embodiment may further include the third rotor core 21-3 in which the coupling portions 51 and the coupling portions 58 are not formed.

Similarly to the configuration of the second embodiment, a non-magnetic hole may be formed in the coupling portion 51 in the configuration of the first embodiment or the coupling portion 51 and the coupling portion 58 in the configuration of the third embodiment.

Similarly to the configuration of the third embodiment, the coupling portion 51 in the configuration of the first or second embodiment may have a configuration of being separable from both of the annular portion 50 and the first core portion 41. Similarly to the configuration of the third embodiment, the coupling portion 58 in the configuration of the second embodiment may have a configuration of being separable from both of the annular portion 50 and the second core portion 42.

REFERENCE SIGNS LIST 10 stator, 11 stator core, 12 core back, 13 teeth, 14 winding, 15 gap, 20 rotor, 21 rotor core, 21-1 first rotor core, 21-2 second rotor core, 21-3 third rotor core, 22 permanent magnet, 23 shaft, 24 protrusion, 30 hole, 31 first hole, 32 second hole, 33 outer peripheral opening portion, 34 inner peripheral opening portion, 35 outer peripheral opening portion, 36 inner peripheral opening portion, 40 core portion, 41 first core portion, 41a inner peripheral surface, 42 second core portion, 42a inner peripheral surface, 50 annular portion, 51 coupling portion, 51a coupling path, 51a1 center line, 51a2, 51a3 side surface, 51b joining boundary, 51c coupling path, 52 protrusion, 53 protrusion group, 54 non-magnetic hole, 54a, 54b edge portion, 54c, 54d recessed portion, 55 fastening hole, 56 first subcoupling portion, 57 second subcoupling portion, 58 coupling portion, 58b joining boundary, 59 non-magnetic hole, 60 fastening hole, 70 end plate, 71 fastening hole, 80 end plate, 81 fastening hole, 82 fastening member, 91, 92 joining recessed portion, 93, 94 joining protrusion, 100 rotating electric machine, 200 rotating electric machine, 201, 202 connecting portion, 300 rotating electric machine, O axial center, Φ1 effective magnetic flux, Φ2 circumferential leakage magnetic flux

The invention claimed is:

1. A rotating electric machine, comprising:
 a stator; and
 a rotor provided on an inner peripheral side of the stator so as to be rotatable with respect to the stator,
 wherein the rotor includes:
  a rotor core;
  a plurality of permanent magnets provided to the rotor core; and
  a shaft which is fixed to a center portion of the rotor core, and extends in an axial direction of the rotor,
 wherein the rotor core has a plurality of holes arranged in a circumferential direction of the rotor,
 wherein the plurality of holes include a plurality of first holes and a plurality of second holes,
 wherein the plurality of permanent magnets are inserted only into the plurality of first holes of the plurality of holes, respectively,
 wherein the plurality of first holes and the plurality of second holes are alternately arranged one by one in the circumferential direction,
 wherein the rotor core includes a plurality of core portions arranged in the circumferential direction with the plurality of second holes defined therebetween, respectively,
 wherein the plurality of permanent magnets are magnetized such that magnetic-pole surfaces facing each other in the circumferential direction have different poles,
 wherein each of the plurality of core portions includes:
  a first core portion located on one magnetic-pole surface side of each of the plurality of permanent magnets; and
  a second core portion located on the other magnetic-pole surface side of each of the plurality of permanent magnets,
 wherein the rotor core includes a first rotor core in at least a part in the axial direction,
 wherein the first rotor core includes a first annular portion and a plurality of first coupling portions,
 wherein the first annular portion is provided on an inner peripheral side with respect to the plurality of core portions, and is formed such that the shaft is inserted thereinto,
 wherein each of the plurality of first coupling portions couples the first annular portion and the first core portion of each of the plurality of core portions to each other,
 wherein each of the plurality of first coupling portions includes at least one coupling path,
 wherein a sum of a width of a portion having the smallest width in the at least one coupling path is smaller than a length of a joining boundary having an arc shape between the first annular portion and each of the plurality of first coupling portions,
 wherein the at least one coupling path is a plurality of coupling paths,
 wherein a non-magnetic hole is formed between two coupling paths adjacent to each other among the plurality of coupling paths, and
 wherein, in a cross section perpendicular to the axial direction, the non-magnetic hole has a circular fastening hole that allows a fastening member to pass therethrough in the axial direction.

2. The rotating electric machine according to claim 1, wherein, in a cross section perpendicular to the axial direction, the non-magnetic hole is arranged on an outer peripheral side with respect to a circle inscribed in the plurality of permanent magnets about an axial center of the rotor.

3. The rotating electric machine according to claim 2, wherein a width of each of the at least one coupling path is constant in a radial direction of the rotor.

4. The rotating electric machine according to claim 2, wherein a circumferential width of the second hole increases from an outer peripheral side toward the inner peripheral side.

5. The rotating electric machine according to claim 1, wherein a width of each of the at least one coupling path is constant in a radial direction of the rotor.

6. The rotating electric machine according to claim 1,
 wherein the rotor further includes an end plate arranged on an outer side of the rotor core in the axial direction, and
 wherein an end portion of each of the plurality of first coupling portions in the axial direction is connected to the end plate.

7. The rotating electric machine according to claim 1,
 wherein the rotor further includes an end plate arranged on an outer side of the rotor core in the axial direction, and
 wherein each of the plurality of first coupling portions and the end plate are fastened by a fastening member passing through the non-magnetic hole.

8. The rotating electric machine according to claim 1, wherein each of the plurality of first coupling portions has a configuration of being separable from both of the first annular portion and the first core portion.

9. The rotating electric machine according to claim 8, wherein each of the plurality of first coupling portions is made of a non-magnetic material.

10. The rotating electric machine according to claim 8,
 wherein the rotor core further includes a second rotor core arranged so as to overlap the first rotor core in the axial direction, and
 wherein the second rotor core includes a second annular portion provided on an inner peripheral side with respect to the plurality of core portions, the second annular portion having the shaft inserted thereinto, and a plurality of second coupling portions that couple the second annular portion and the second core portions of the plurality of core portions to each other, respectively.

11. The rotating electric machine according to claim 8, wherein a circumferential width of the second hole increases from an outer peripheral side toward the inner peripheral side.

12. The rotating electric machine according to claim 1, wherein the first annular portion has a protrusion that is formed on an inner peripheral surface of the first annular portion and is in contact with an outer peripheral surface of the shaft.

13. The rotating electric machine according to claim 12, wherein the protrusion is arranged at a position shifted from each of the plurality of first coupling portions in the circumferential direction.

14. The rotating electric machine according to claim 1,
wherein, in a cross section perpendicular to the axial direction, the first annular portion includes a plurality of protrusion groups each including at least one protrusion that is formed on an inner peripheral surface of the first annular portion and is in contact with an outer peripheral surface of the shaft, and wherein each of the plurality of protrusion groups is provided between two first coupling portions adjacent to each other among the plurality of first coupling portions in the circumferential direction.

15. The rotating electric machine according to claim 1, wherein the shaft has a protrusion that is formed on an outer peripheral surface of the shaft and is in contact with an inner peripheral surface of the first annular portion.

16. The rotating electric machine according to claim 1,
wherein the rotor core further includes a second rotor core arranged so as to overlap the first rotor core in the axial direction, and wherein the second rotor core includes a second annular portion provided on an inner peripheral side with respect to the plurality of core portions, the second annular portion having the shaft inserted thereinto, and a plurality of second coupling portions that couple the second annular portion and the second core portions of the plurality of core portions to each other, respectively.

17. The rotating electric machine according to claim 16,
wherein the rotor core further includes a third rotor core arranged so as to overlap the first rotor core and the second rotor core in the axial direction, wherein the third rotor core includes a third annular portion provided on an inner peripheral side with respect to the plurality of core portions, the third annular portion having the shaft inserted thereinto, and wherein, in a cross section perpendicular to the axial direction, the third annular portion is away from any of the first core portion and the second core portion of the plurality of core portions.

18. The rotating electric machine according to claim 1, wherein a circumferential width of the second hole increases from an outer peripheral side toward the inner peripheral side.

* * * * *